Sept. 2, 1958 F. H. BRAY ET AL 2,850,571

MAGNETIC STORE FOR TELEPHONE METER IMPULSES

Filed Sept. 10, 1953 35 Sheets-Sheet 1

Inventor
F. H. BRAY - P. M. KING - J. RICE

By Robert Harding Jr.
Attorney

MAGNETIC STORE FOR TELEPHONE METER IMPULSES

Filed Sept. 10, 1953 35 Sheets-Sheet 2

Inventor
F. H. BRAY - P. M. KING - J. RICE
By Robert Harding Jr.
Attorney

Inventor
F. H. BRAY - P. M. KING -
J. RICE
By Robert Harding Jr
Attorney

Inventor
F. H. BRAY- P.M. KING-
J. RICE
By Robert Harding Jr.
Attorney

Sept. 2, 1958 F. H. BRAY ET AL 2,850,571

MAGNETIC STORE FOR TELEPHONE METER IMPULSES

Filed Sept. 10, 1953 35 Sheets-Sheet 5

Inventor
F. H. BRAY · P. M. KING · J. RICE
By Robert Harding Jr.
Attorney

Inventor
F. H. BRAY - P. M. KING
J. RICE
By Robert Harding Jr.
Attorney

Inventor
F. H. BRAY - P. M. KING
J. RICE
By Robert Harding Jr.
Attorney

Sept. 2, 1958 F. H. BRAY ET AL 2,850,571

MAGNETIC STORE FOR TELEPHONE METER IMPULSES

Filed Sept. 10, 1953 35 Sheets-Sheet 8

Inventor
F. H. BRAY - P. M. KING
J. RICE
By Robert Harding Jr.
Attorney

MAGNETIC STORE FOR TELEPHONE METER IMPULSES

Filed Sept. 10, 1953 35 Sheets-Sheet 9

Inventor
F. H. BRAY · P. M. KING ·
J. RICE
By Robert Harding Jr
Attorney

Sept. 2, 1958 F. H. BRAY ET AL 2,850,571

MAGNETIC STORE FOR TELEPHONE METER IMPULSES

Filed Sept. 10, 1953 35 Sheets-Sheet 10

Inventor
F. H. BRAY - P. M. KING
J. RICE
By Robert Harding Jr
Attorney

Sept. 2, 1958 F. H. BRAY ET AL 2,850,571

MAGNETIC STORE FOR TELEPHONE METER IMPULSES

Filed Sept. 10, 1953 35 Sheets-Sheet 11

Inventor
F. H. BRAY- P. M. KING-
J. RICE
By Robert Harding Jr
Attorney

Sept. 2, 1958 F. H. BRAY ET AL 2,850,571

MAGNETIC STORE FOR TELEPHONE METER IMPULSES

Filed Sept. 10, 1953 35 Sheets-Sheet 12

Inventor
F. H. BRAY - P. M. KING
J. RICE
By Robert Harding Jr.
Attorney

Sept. 2, 1958 F. H. BRAY ET AL 2,850,571

MAGNETIC STORE FOR TELEPHONE METER IMPULSES

Filed Sept. 10, 1953 35 Sheets-Sheet 13

Inventor
F. H. BRAY - P. M. KING - J. RICE
By Robert Harding Jr.
Attorney

Inventor
F. H. BRAY - P. M. KING -
J. RICE
By Robert Harding Jr.
Attorney

Inventor
F. H. BRAY - P. M. KING -
J. RICE
By Robert Harding Jr.
Attorney

Inventor
F. H. BRAY · P. M. KING · J. RICE
By Robert Harding Jr.
Attorney

Inventor
F. H. BRAY - P. M. KING -
J. RICE
By Robert Harding Jr.
Attorney

Inventor
F. H. BRAY - P. M. KING -
J. RICE
By Robert Harding Jr.
Attorney

Inventor
F. H. BRAY - P. M. KING -
J. RICE
By Robert Harding Jr.
Attorney

Sept. 2, 1958 F. H. BRAY ET AL 2,850,571

MAGNETIC STORE FOR TELEPHONE METER IMPULSES

Filed Sept. 10, 1953 35 Sheets-Sheet 20

Inventor
F. H. BRAY - P. M. KING - J. RICE
By
Robert Harding Jr.
Attorney

Inventor
F. H. BRAY · P. M. KING
J. RICE
By Robert Harding Jr.
Attorney

Sept. 2, 1958 F. H. BRAY ET AL 2,850,571

MAGNETIC STORE FOR TELEPHONE METER IMPULSES

Filed Sept. 10, 1953 35 Sheets-Sheet 22

Inventor
F. H. BRAY- P. M. KING-
J. RICE
By Robert Harding Jr.
Attorney

Inventor
F. H. BRAY- P. M. KING-
J. RICE
By Robert Harding Jr.
Attorney

TIMING & TEMPORARY FEE TRACK CCT.

Inventor
F. H. BRAY- P. M. KING-
J. RICE
By Robert Harding Jr.
Attorney

Inventor
F. H. BRAY - P. M. KING - J. RICE
By Robert Harding Jr.
Attorney

Inventor
F. H. BRAY- P. M. KING
J. RICE
By Robert Harding Jr.
Attorney

Inventor
F. H. BRAY-
P. M. KING- J. RICE
By Robert Harding Jr.
Attorney

Inventor
F. H. BRAY- P. M. KING-
J. RICE
By Robert Harding Jr.
Attorney

Inventor
F. H. BRAY- P. M. KING
J. RICE
By Robert Harding Jr.
Attorney

Sept. 2, 1958 F. H. BRAY ET AL 2,850,571

MAGNETIC STORE FOR TELEPHONE METER IMPULSES

Filed Sept. 10, 1953 35 Sheets-Sheet 30

Inventor
F. H. BRAY- P.M. KING
J. RICE
By Robert Harding Jr.
Attorney

Sept. 2, 1958 F. H. BRAY ET AL 2,850,571

MAGNETIC STORE FOR TELEPHONE METER IMPULSES

Filed Sept. 10, 1953 35 Sheets-Sheet 31

Inventor
F. H. BRAY - P. M. KING
J. RICE
By Robert Harding Jr.
Attorney

Inventor
F. H. BRAY - P. M. KING - J. RICE
By Robert Harding Jr.
Attorney

Inventor
F. H. BRAY - P. M. KING - J. RICE
By Robert Harding Jr.
Attorney

Inventor
F. H. BRAY - P. M. KING -
J. RICE
By Robert Harding Jr.
Attorney

Inventor
F. H. BRAY - P. M. KING - J. RICE
By Robert Harding Jr.
Attorney

United States Patent Office 2,850,571
Patented Sept. 2, 1958

2,850,571

MAGNETIC STORE FOR TELEPHONE METER IMPULSES

Frederick Harry Bray, Peter Morris King, and Joseph Rice, London, England, assignors to International Standard Electric Corporation, New York, N. Y.

Application September 10, 1953, Serial No. 379,422

Claims priority, application Great Britain September 19, 1952

16 Claims. (Cl. 179—7)

The present invention relates to intelligence storage equipment.

According to the present invention there is provided intelligence storage equipment, which comprises a number of user circuits, a number of stores on each of which intelligence can be recorded, a plurality of which are individually allocated to each one of said user circuits, recording and reading means associated with said stores, a control circuit associated with said recording and reading means and with all of said user circuits, and means in said control circuit for causing said recording means to record intelligence relating to any one of said user circuits on a store allocated to that user circuit.

According to the present invention there is further provided intelligence storage equipment, which comprises a number of user circuits, a track of magnetic-material on which intelligence can be recorded and which provides a number of stores, a plurality of which are individually allocated to each one of said user circuits, recording and reading means associated with said track, a control circuit associated with said recording and reading means and with all of said user circuits, and means in said control circuit for causing said recording means to record intelligence relating to any one of said user circuits on a store allocated to that user circuit.

According to the present invention there is further provided intelligence storage equipment, which comprises a number of user circuits, a rotatable drum having a peripheral skin of magnetic material which provides a number of circumferential tracks on each of which intelligence can be recorded and each of which tracks provides a number of stores, a plurality of said stores being allocated to each of said user circuits, each of said stores allocated to one of said user circuits, forming part of a different one of said tracks, recording and reading means associated with each of said tracks, a control circuit associated with all of said recording and reading means and with all of said user circuits, and means in said control circuit for causing the appropriate one of said recording means to record intelligence relating to any one of user circuits on any one of the stores allocated to that user circuit.

According to the present invention there is still further provided intelligence storage equipment, which comprises a number of stores on each of which intelligence can be recorded, recording and reading means associated with said stores, a control circuit associated with said recording and reading means, means in said control circuit responsive to reception of intelligence to be stored to cause said recording means to record said intelligence in one of said stores used for temporary storage, and means in said control circuit for causing the intelligence recorded in said temporary store to be transferred to another store.

According to the present invention there is still further provided a subscribers' metering system such as is used in automatic telecommunication exchange systems, which comprises a number of incoming metering leads each associated with a subscriber's line, a number of stores on each of which intelligence can be recorded, a plurality of said stores being allocated to each of said subscribers for recording separately the numbers of calls of each of a plurality of fee values for each of said subscribers, recording and reading means associated with said stores, a control circuit associated with said recording and reading means and with all of said subscriber's metering leads, means in said control circuit responsive to reception of a metering signal on the metering lead of one of said subscribers, discriminating means in said control circuit under control of said responsive means for determining the fee value to which a received metering signal relates, means in said control circuit for causing said reading means to read the contents of that one of said stores allocated to the subscriber from whom a metering signal has been received which relates to the fee value for the call being metered, means in said control circuit for adding one to the number of calls already stored in the section read out, and means in said control circuit for causing said recording means to record the modified number of calls in the store from which a number was read out to be modified.

The term "store" as used in this specification means a device in which intelligence can be stored by creating internal strains in the material of the store, and in which stored intelligence can be detected by detecting the state of the strain in the material.

Examples of internal strains which are used to store intelligence are magnetisations of either one of two polarities, as in the magnetic drum, tape or wire, or in the static magnetic matrix, electrifications of either one of two polarities as in the ferro-electric storage matrix, electric charges of either one of two polarities as in the cathode ray tube storage device, and compression waves as in acoustic delay lines such as mercury delay lines and magnetostrictive delay lines.

The term store as used in the present specification and in the claims appended thereto should therefore be interpreted to include any device falling within the terms of this definition, and in any case includes all of the examples listed in the preceding paragraph.

The invention will be described with reference to two embodiments which relate to multi-fee subscriber metering in automatic telephone exchange systems and which are shown in the accompanying drawings in which:

Figs. 1 and 2 which should be placed side by side, show the track lay out and associated pulse cycles of a peripheral track on a magnetic drum, which track is capable of storing the metering records of a number of telephone subscribers. Each record comprises time pulse positions, a temporary fee store for checking the value of a metering condition to be recorded, and permanent fee stores for single, double, treble, and quadruple fees respectively.

Figs. 3, 4 and 5 together show detailed circuits of a common equipment controlling storage and storage modification on a drum track.

Figs. 6, 7 and 8 together show so-called functional symbol diagrams exactly corresponding to Figs. 3, 4 and 5.

Figs. 9–20 show the sequence of operations of the flip-flops F1—F7 of the circuits shown in Figs. 3–8 during successive rotations of the magnetic drum during metering and for different metering conditions.

Figs. 21–35 relates to an alternative embodiment, in which

Figs. 21 and 22 which should be placed side by side show the track lay out and associated pulse cycles of five peripheral magnetic tracks, which are allocated in common to a number of subscribers meter records, and corresponding sections of which are allocated to a single subscriber respectively for timing and temporary fee storage; and for single fee, double fee, treble fee, and quadruple fee, records.

Figure 1:
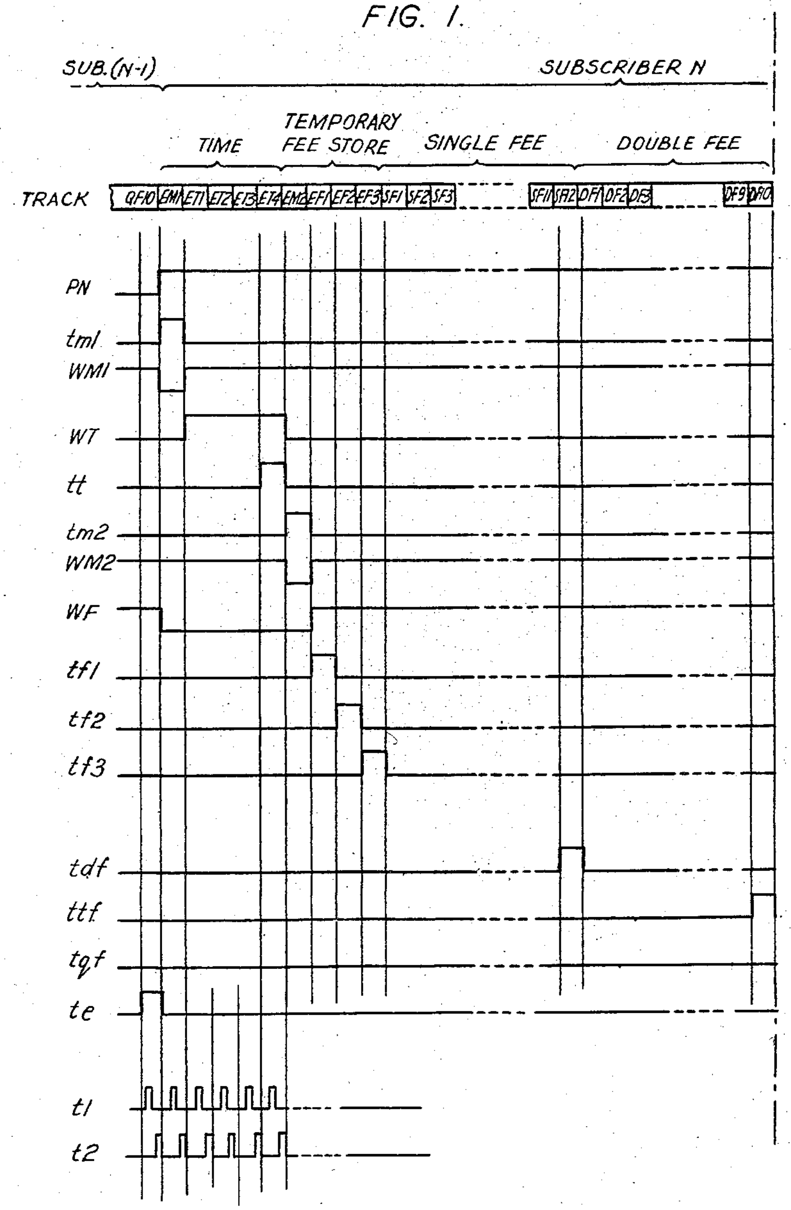

In present metering schemes, calls, whether of the single or multi-fee type are registered on mechanical meters in terms of single fee units, the resulting total giving no indication of the type of calls that have been made, only their value in single fee units. In the circuit about to be described, a pulse multiplex system is used to scan a number of subscribers line circuits, and if the P lead of a line circuit is found in a metering condition, to record this fact on a magnetic drum in the manner described in the copending application of E. P. G. Wright et al., filed May 22, 1952, and bearing Serial No. 289,383.

The present invention makes provision for making separate records for calls to be charged differently. In the embodiment shown in Figs. 1–20 the method used, is to divide each track of the drum into a number of sections. Each section is associated by means of the multiplex or position pulse as it is called, to a particular subscribers line circuit. These track sections are then sub-divided as follows. The first sub-division is used as a timing section. Sub-division two is used as a temporary store, for single or multi-fee pulses occurring in one metering operation. The permanent record stores then follow the temporary store in order of magnitude, the store of least significance first.

The arithmetic technique for counting meter pulses of drum revolutions, uses a binary form of numbering, the digit of least significance appearing at the read head first. If it is desired to make an addition of one, then all elements forming the binary number are reversed, up to and including the first "0." Following elements are then repeated unchanged.

| Decimal e. g.— | Binary |
|---|---|
| 7= | 00111 |
| +1=8= | 01000 |
| +1=9= | 01001 etc. |

Intelligence stored in the temporary fee store, at a time controlled by the timing section, is transferred to the appropriate permanent store. At the same time as the transfer takes place the temporary fee store intelligence is erased. This leaves the store ready to accept further information, and the appropriate permanent store intelligence greater by one. The timing store is so arranged that when a transition occurs of the P lead condition, all previous timing are erased and timing restarted from 0. Thus if the point at which fee transfer takes place is say twice the period of the longest meter pulse, or inter-pulse period, the transfer circuit cannot operate until the particular pulse or pulse train has ceased.

In Figs. 3–8, F1 is a read flip-flop which responds to the intelligence drawn from the track of the drum by a read head. The A side conducting indicates the track condition is such that a "1" is stored, the B side conducting indicating a "0."

F2 is a flip-flop which indicates to the control circuit, the condition of the "P lead." When the D side is conducting, it shows the presence of a meter pulse. The C side conducting denotes the absence of a meter pulse or that the flip-flop has been re-set from indicating such a pulse.

Flip-flop F3 is part of the addition circuit, and is arranged so that, with the F side conducting, the drum intelligence indicated by F1 shall be reversed by the recording circuit. With the E side conducting the intelligence shall be recorded unchanged.

F4 is a record flip-flop, which, with its associated gates is arranged to control whether the intelligence recorded shall be digit 1 or digit 0. G side conducting records digit "1" and H conducting records digit 0.

Flip-flop F5 shows with the J side conducting, that a transition has occurred on the "P lead." The K side conducting indicates that the "P lead" condition is stable.

F6 is operated by the intelligence in the time store reaching a critical value, such that element E. T. 4 is "1." This in conjunction with *tt* pulse causes F6 to conduct on the S side, and initiate the temporary fee store intelligence transfer. After initiating this function it is reset to the T side.

F7 is in effect a five position multi-stable register, each element of which is particular to a permanent fee store. Thus when transfer occurs, the intelligence in the temporary fee store causes the appropriate element to conduct. Information in the temporary fee store can thus be erased, F7 retaining this intelligence until the appropriate track section arrives at the record head.

N=Normal condition.
S=Indicates single fee store.
D=indicates double fee store.
T=Indicates treble fee store.
Q=Indicates quadruple fee store.

Figure 2:
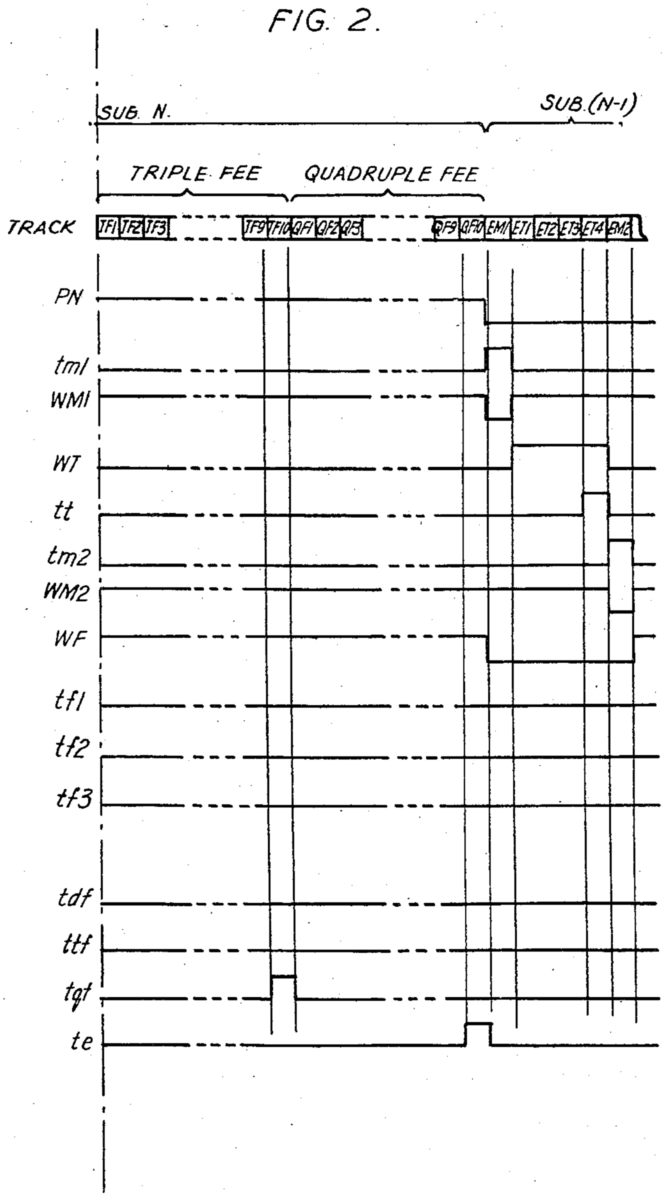

The wave forms shown in Figs. 1 and 2 have the following functions: *tm*1 initiates circuit operations peculiar to the first element of the timing section E*m*1, and is an integral part of the master control wave for the timing section. W*m*1 is an inversion of *tm*1. WT, in association with *tm*1, is the master control waveform for the period during which the timing section of the track is in operation. The following gates associated with timing circuit are inoperative without these two waveforms; gates G1, G4, G15, G16, G17, G18, G19, G20, G21, G25, G26, G27 and G28. Thus in the ensuing circuit description when discussing fee transfer and temporary fee store circuit operation it will be understood that all these gates are inoperative.

Wave-form *tt* initiates temporary fee transfer in conjunction with element ET4; *tm*2 similarly to *tm*1, is peculiar to the circuit functions associated with the first element of the temporary fee section, and is also an integral part of the master control wave-form of the temporary fee, fee transfer, and permanent fee store circuit functions. Wave-form W*m*2 is an inversion of *tm*2, and in conjunction with W*m*1 holds certain gates inoperative during the elements in which wave-forms *tm*1 and *tm*2 are operative, the gates being G3 and G10. Wave-form WF, in conjunction with *tm*2, forms the master control wave-form for the circuit functions mentioned under *tm*2.

The gates associated with these circuit functions which must be considered inoperative when wave-forms *tm*2 and WF are not present are: G2, G5, G22, G23, G24 G29, G30 and G31.

Wave-form *tf*1, in conjunction with a "one" being stored on element EF1 in the temporary fee store, will cause section S of F7 to conduct at the time of fee transfer.

Wave-form *tf*2, with "one" stored on element EF2 of the temporary fee store only, will cause section D of F7 to conduct at the time of fee transfer. If "one" has been stored on EF1, as well as EF2, it will cause section T of F7 to conduct.

Wave-form *tf*3 controls fee transfer into the quadruple fee store in conjunction with element EF3. Also rests F6.

Depending upon the section of F7 which is conducting, the four pulses *tf*3, *tdf*, *ttf*, *tqf* cause the addition circuit to modify the intelligence in the single double, treble and quadruple store respectively. Pulse *tf*3 could be called *tsf* but as the position occupied by the two pulses is identical *tf*3 has been used for both functions.

Switching pulses $t1$, $t2$ are narrow pulses which initiate the various circuit operations within the period of one storage element.

Figure 3:
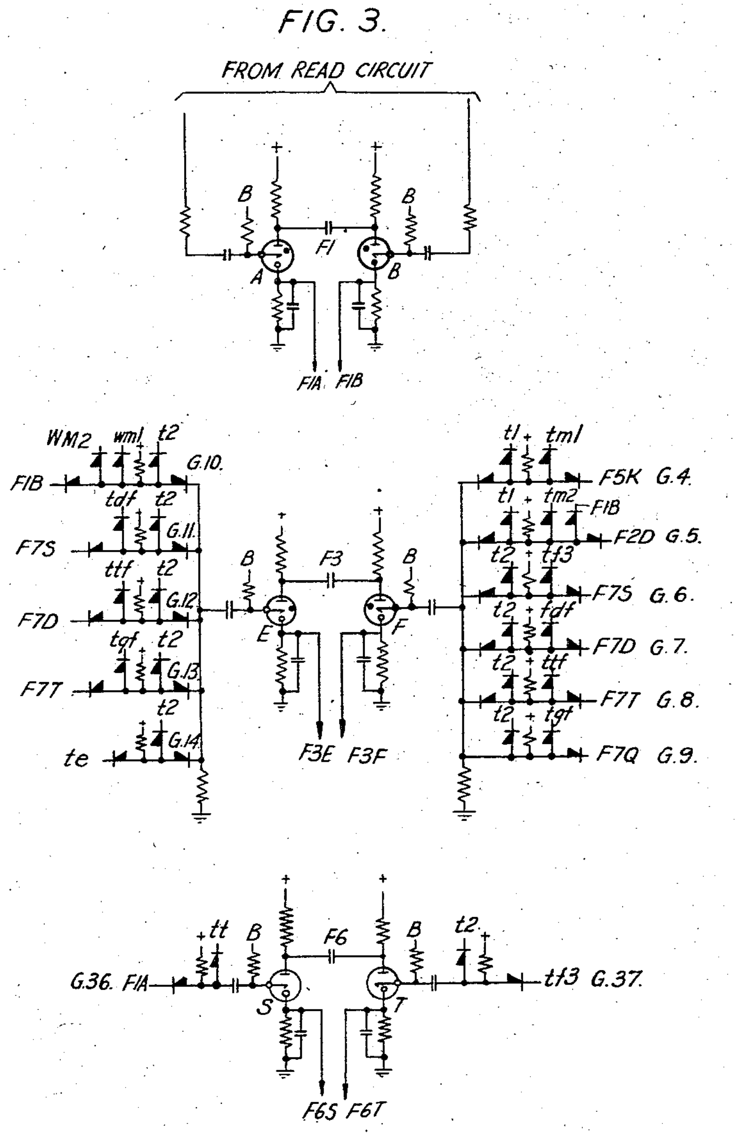
Figure 4:
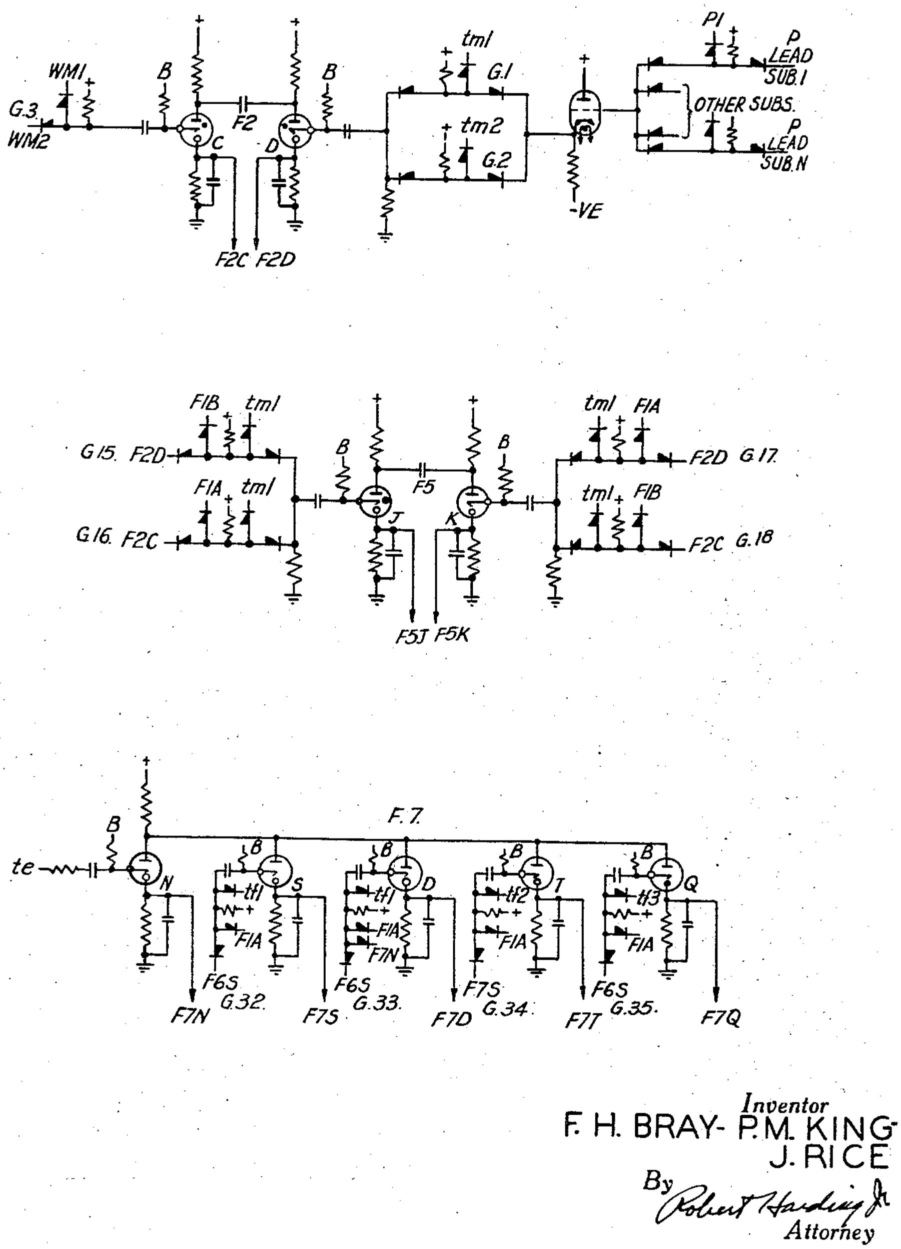
Figure 5:
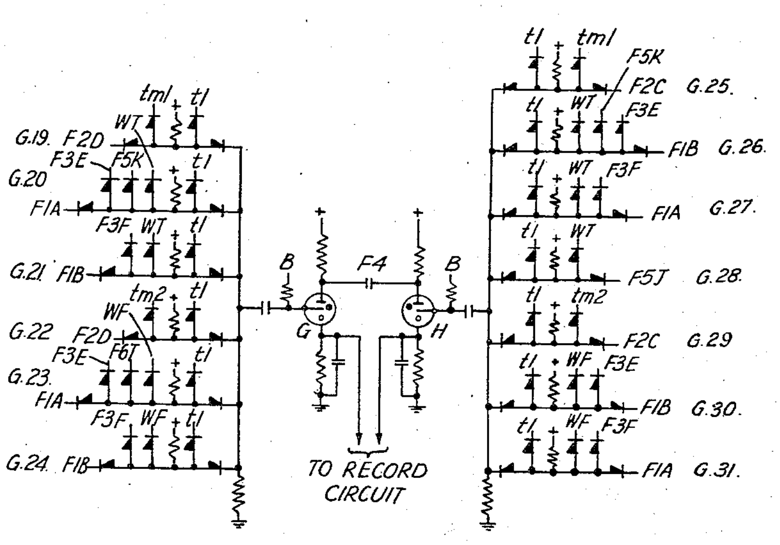
Figure 6:
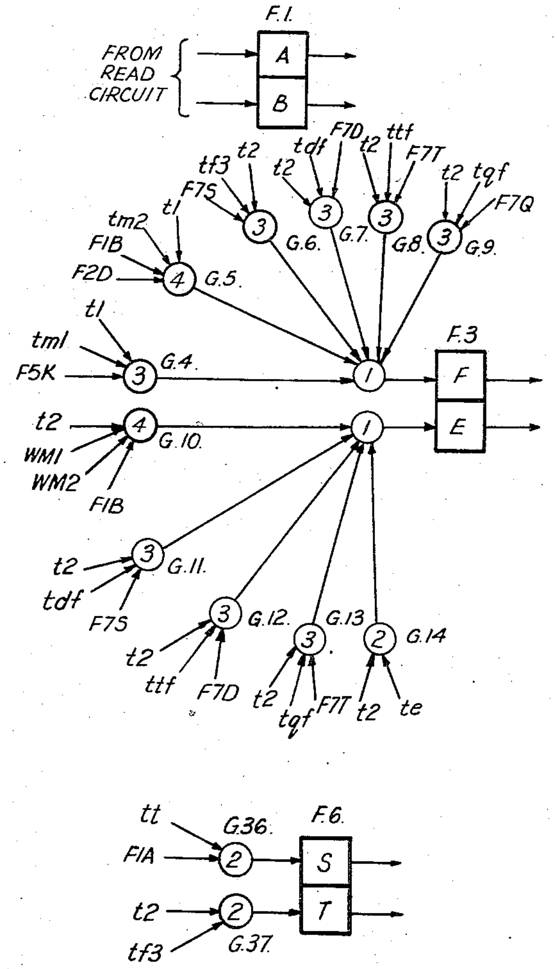
Figure 7:
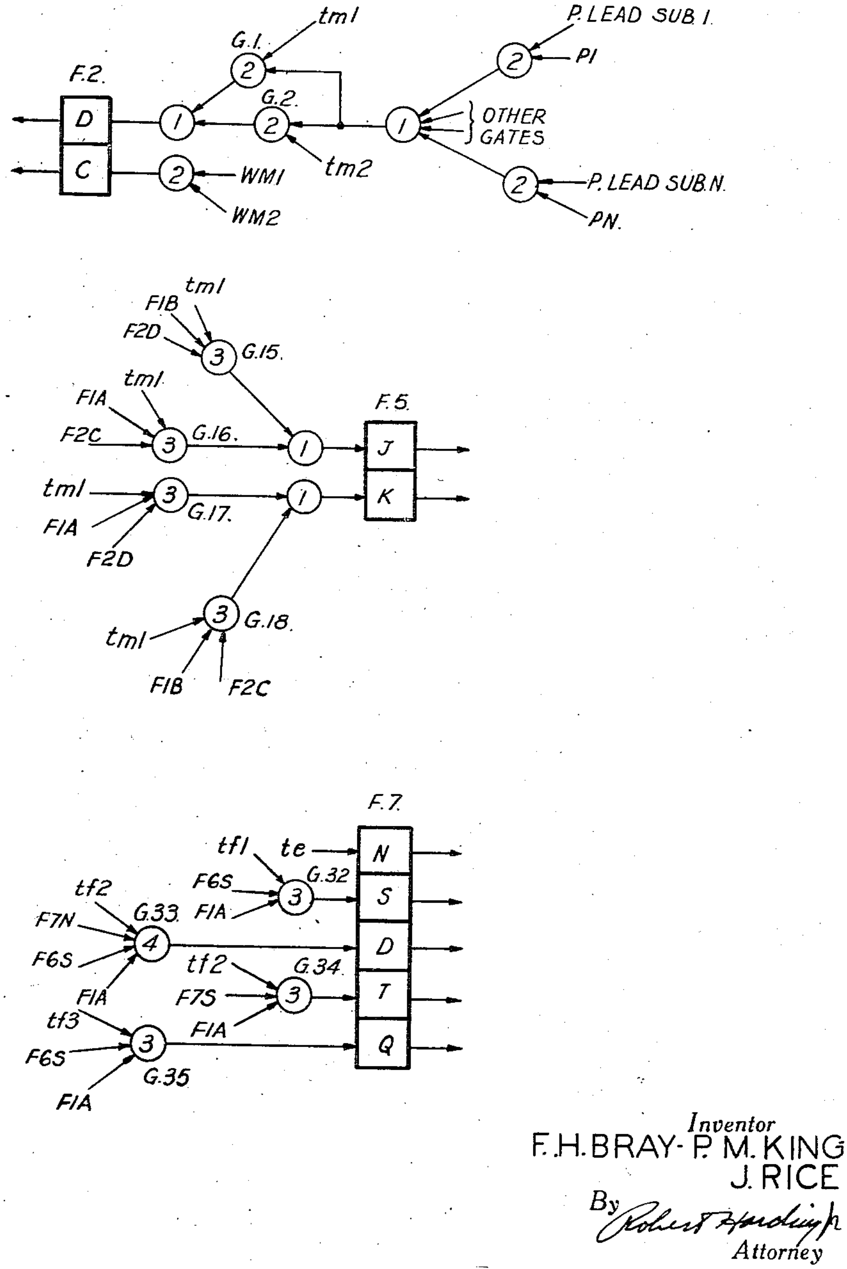
Figure 8:
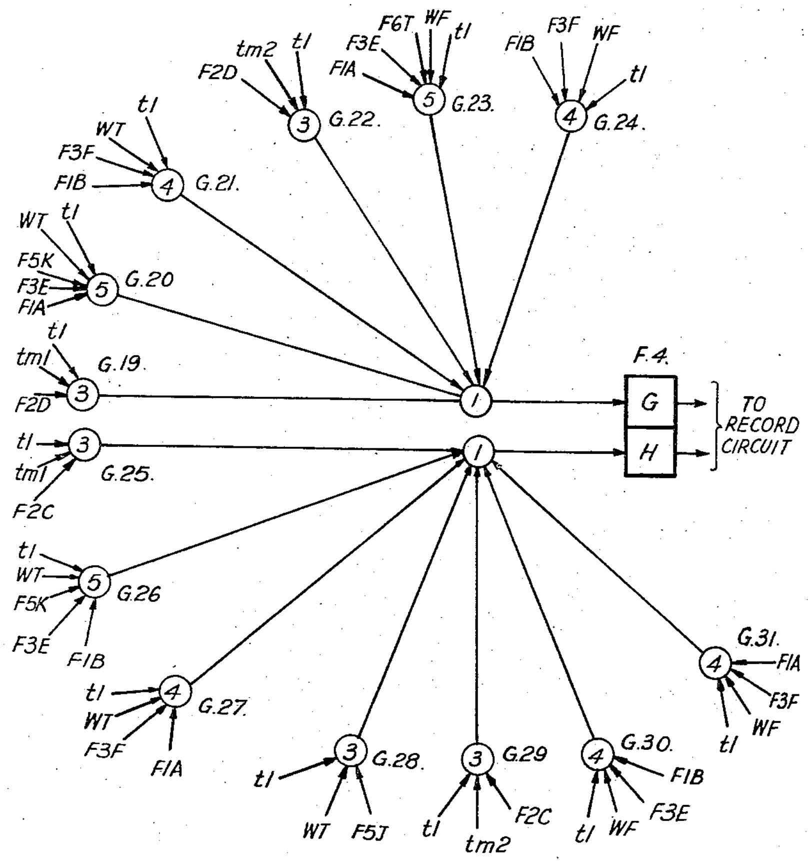

The ensuing description applies equally well to both the detailed circuits of Figs. 3–5, and the functional diagrams of Figs. 6–8. For the purposes of the description the following "P lead" and drum conditions have been assumed, Figs. 9–20 showing the cathode output waveforms of the individual tubes of the flip-flops F1 to F7 under these conditions.

Figure 9:
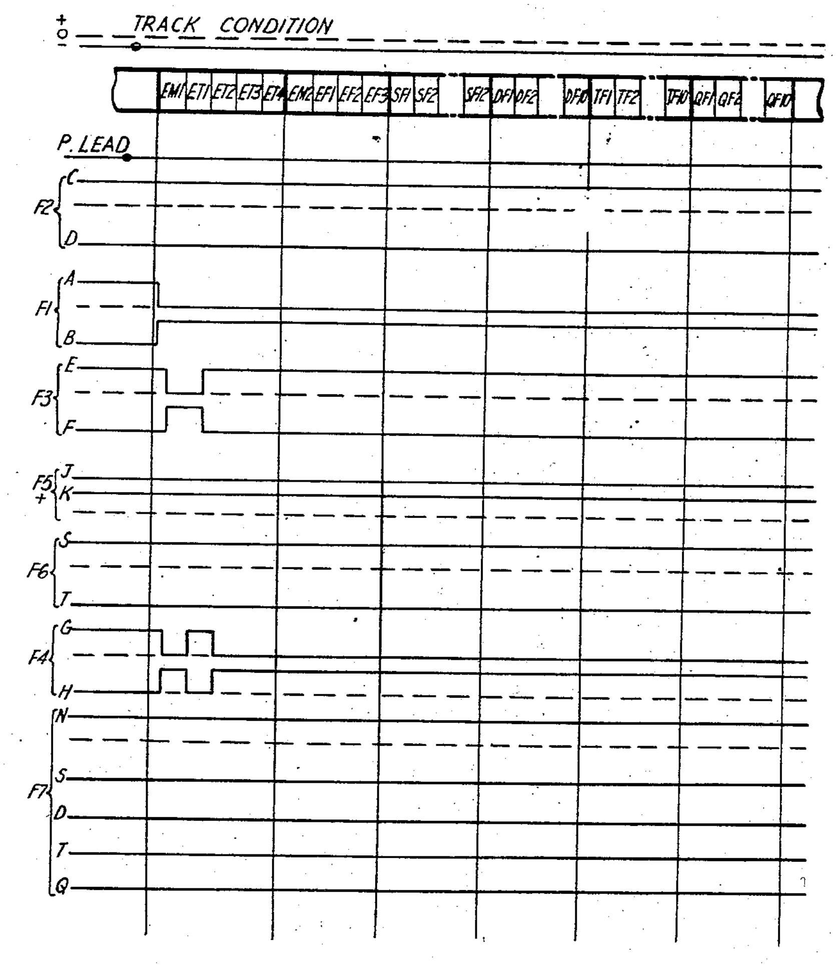
Figure 10:
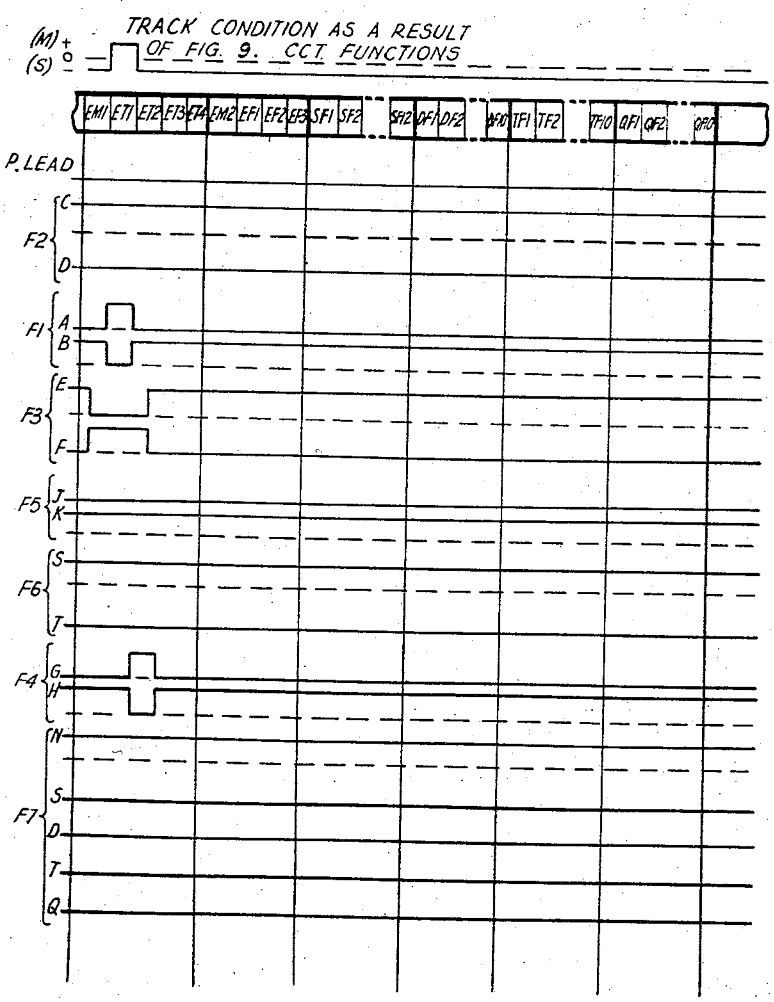

Figs. 9 and 10: no meter or track conditions exist.

Figure 11:
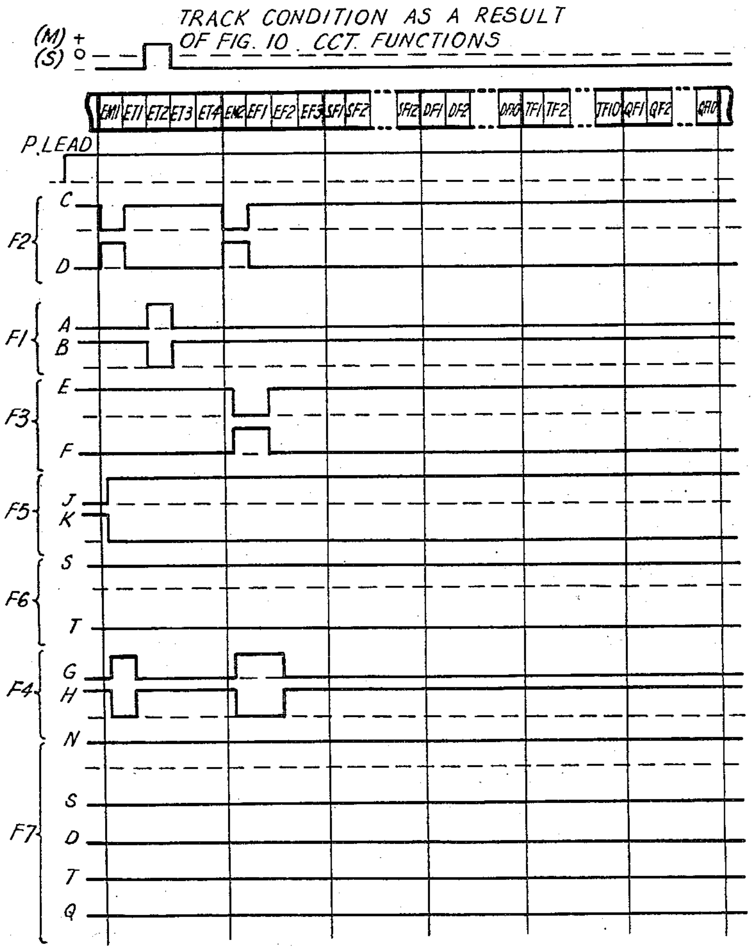
Figure 12:
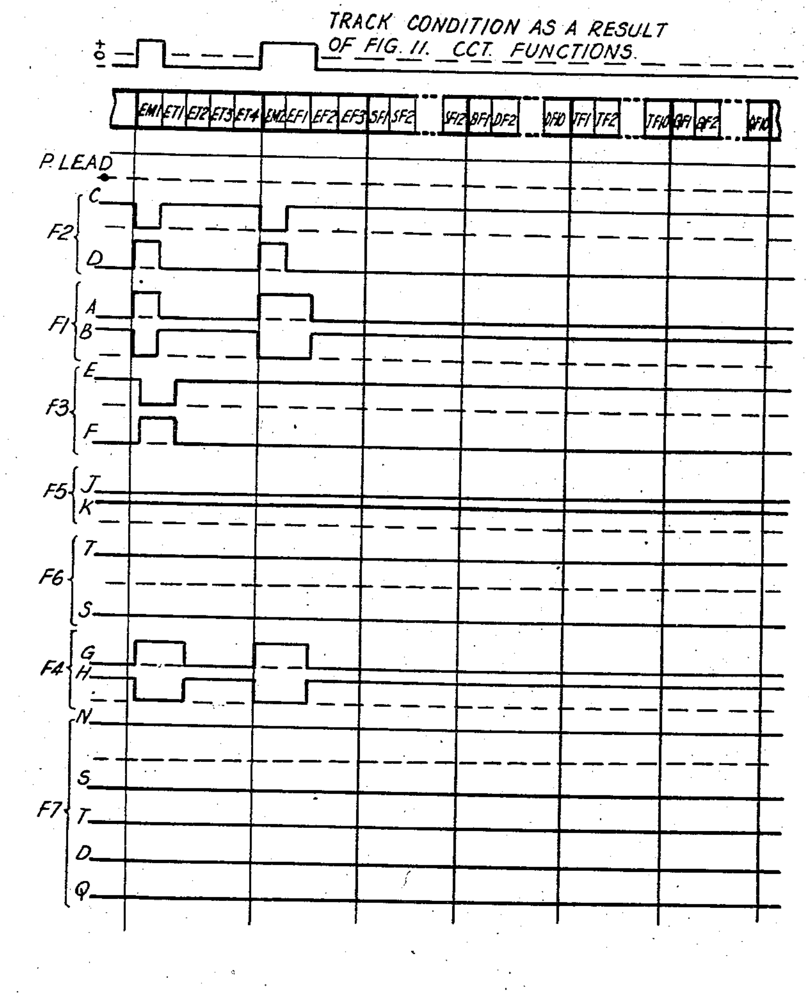

Figs. 11 and 12: the first meter pulse of a double fee call appears on the "P lead."

Figure 13:
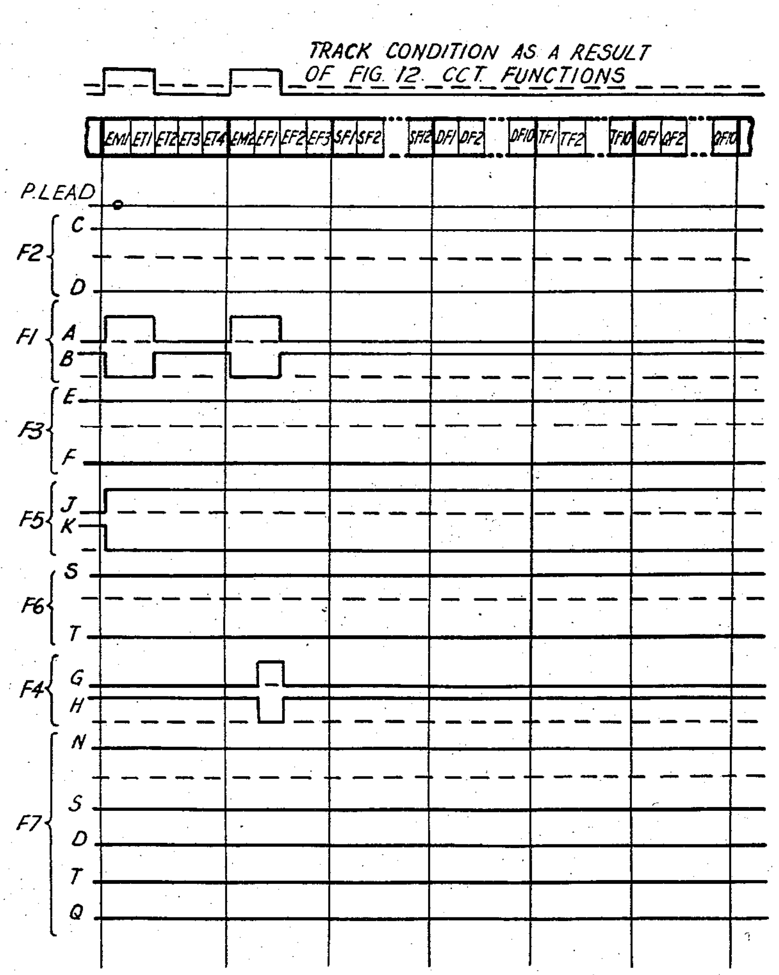
Figure 14:
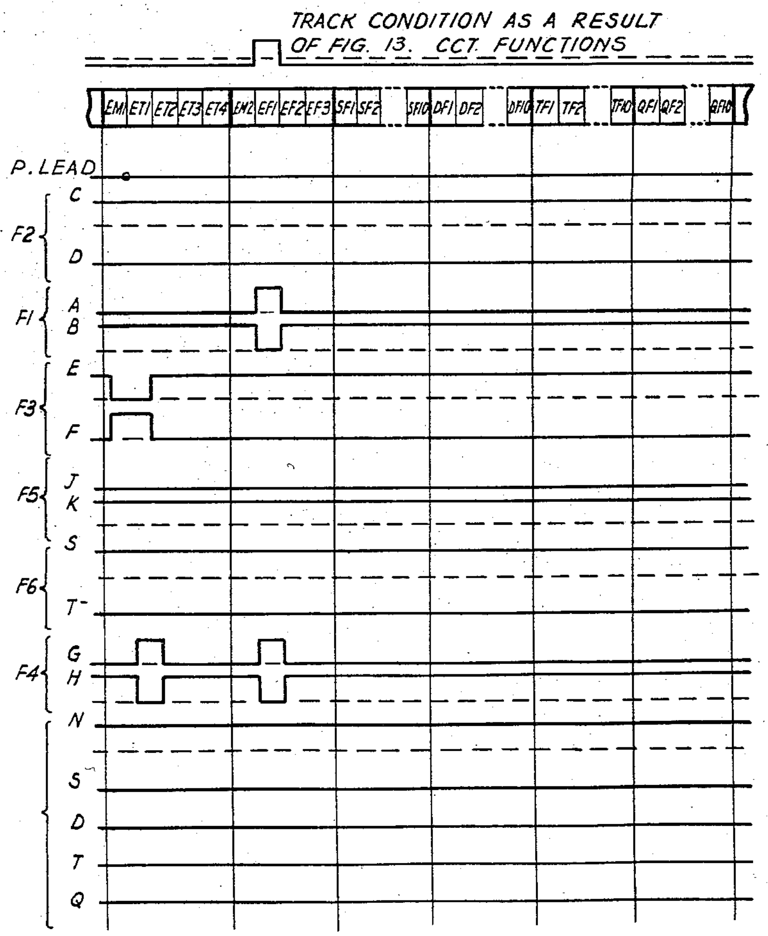

Figs. 13 and 14: pause between first and second meter pulse.

Figure 15:
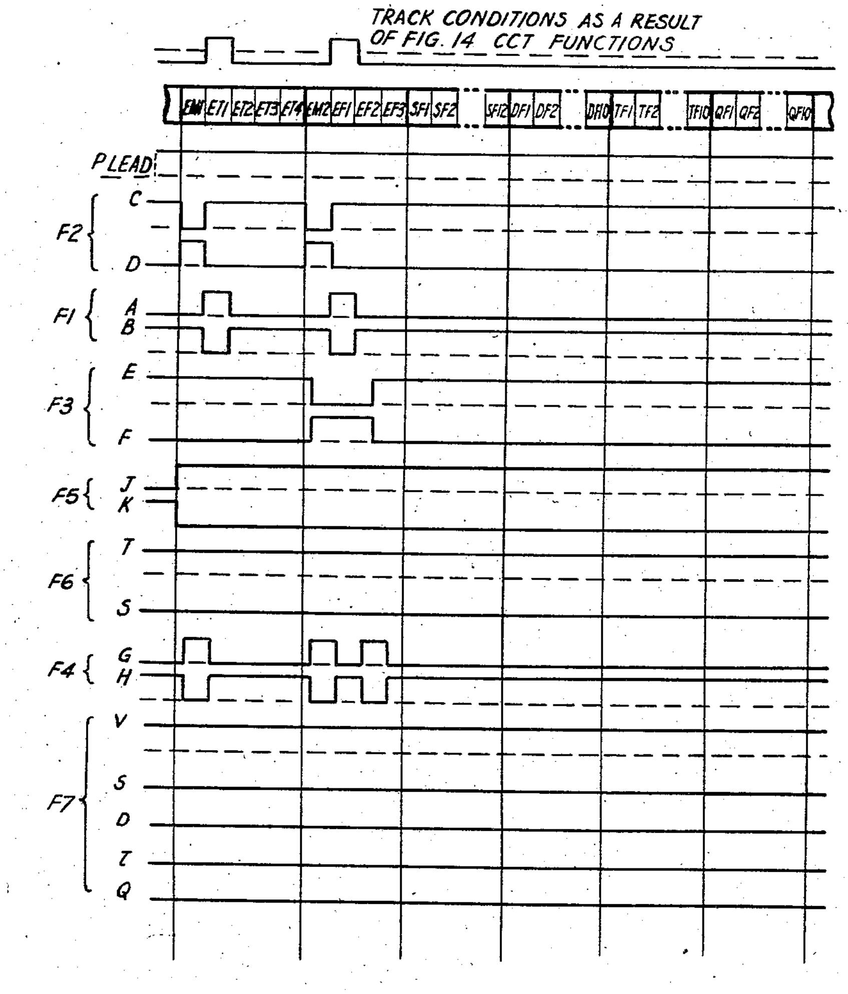
Figure 16:
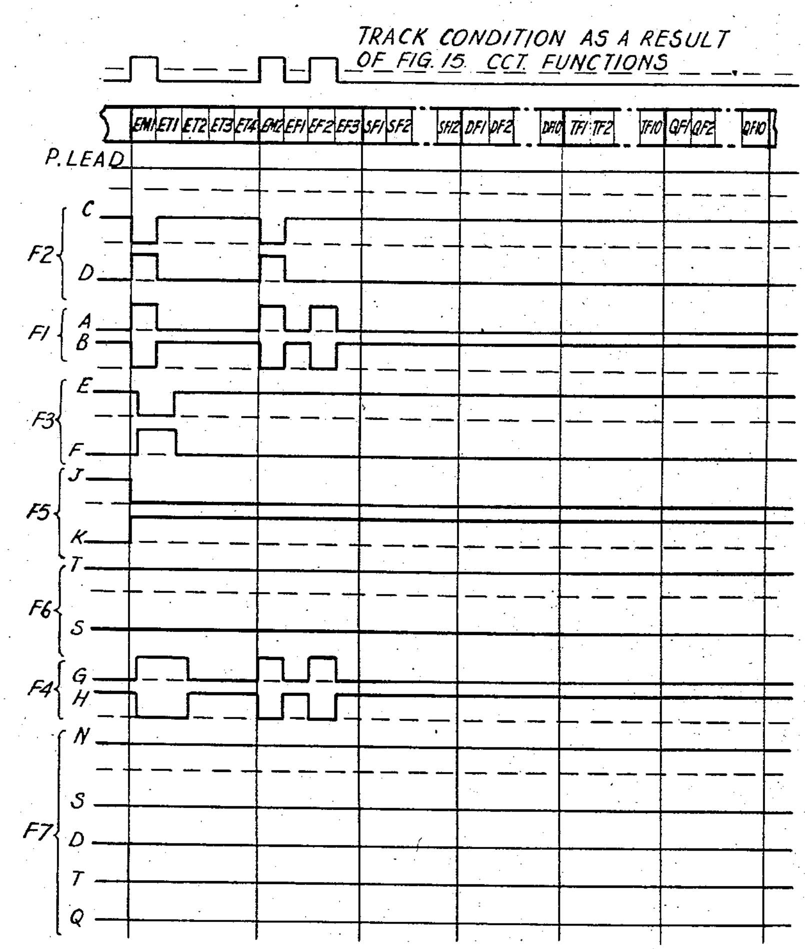

Figs. 15 and 16: second meter pulse appears.

Figure 17:
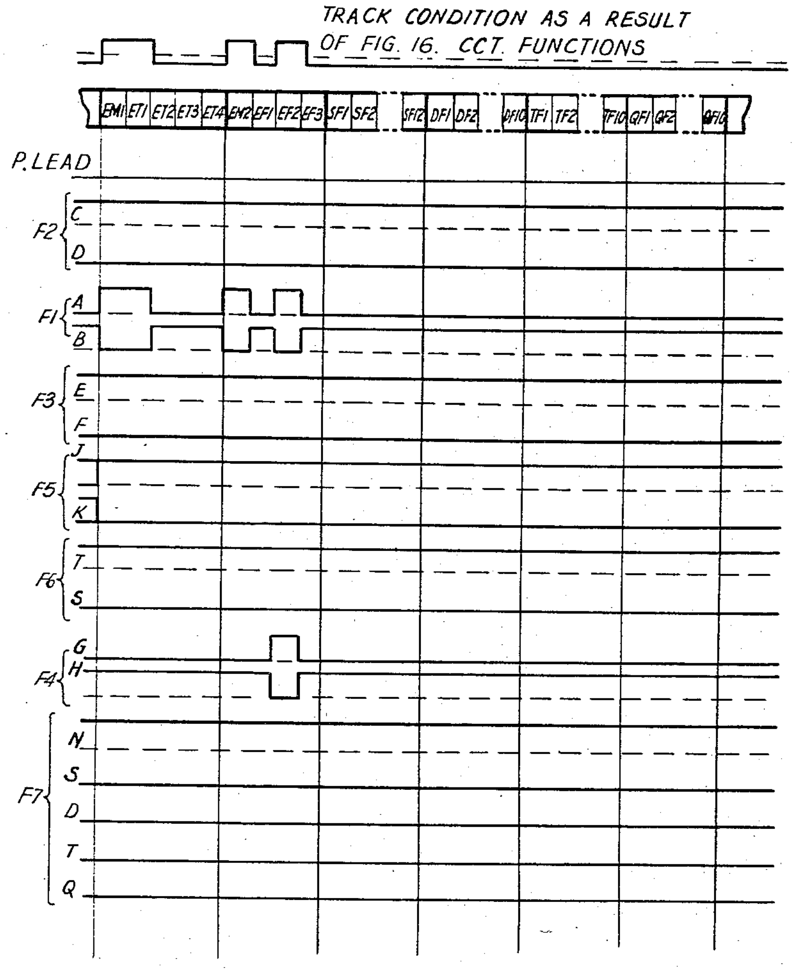
Figure 18:
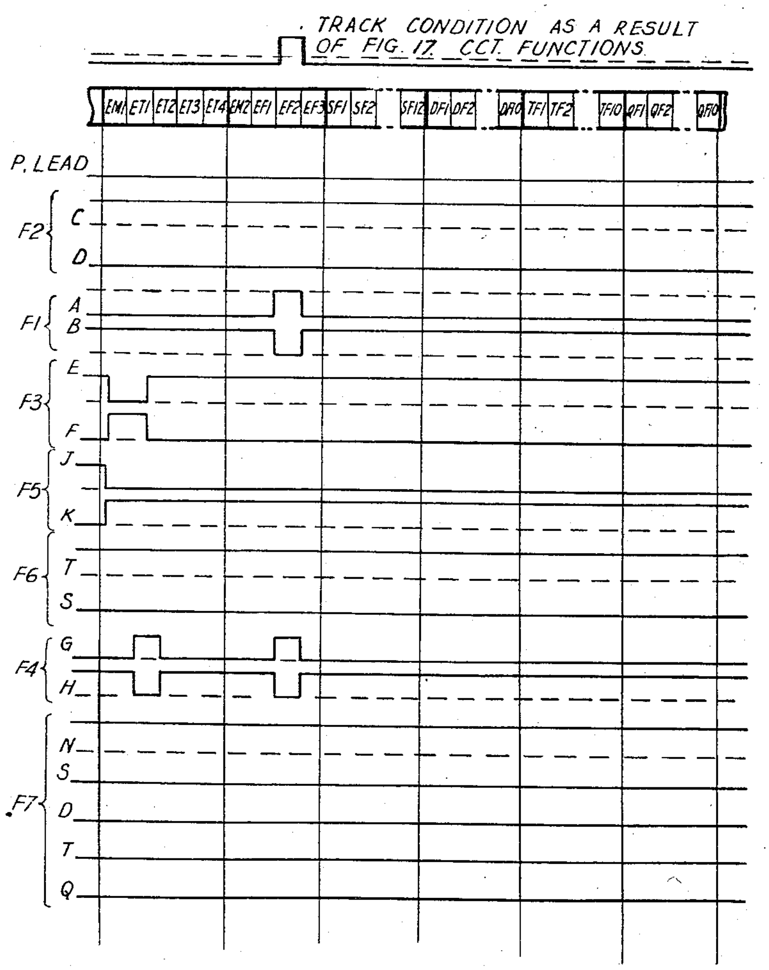

Figs. 17 and 18: second meter pulse ceases.

Figure 19:
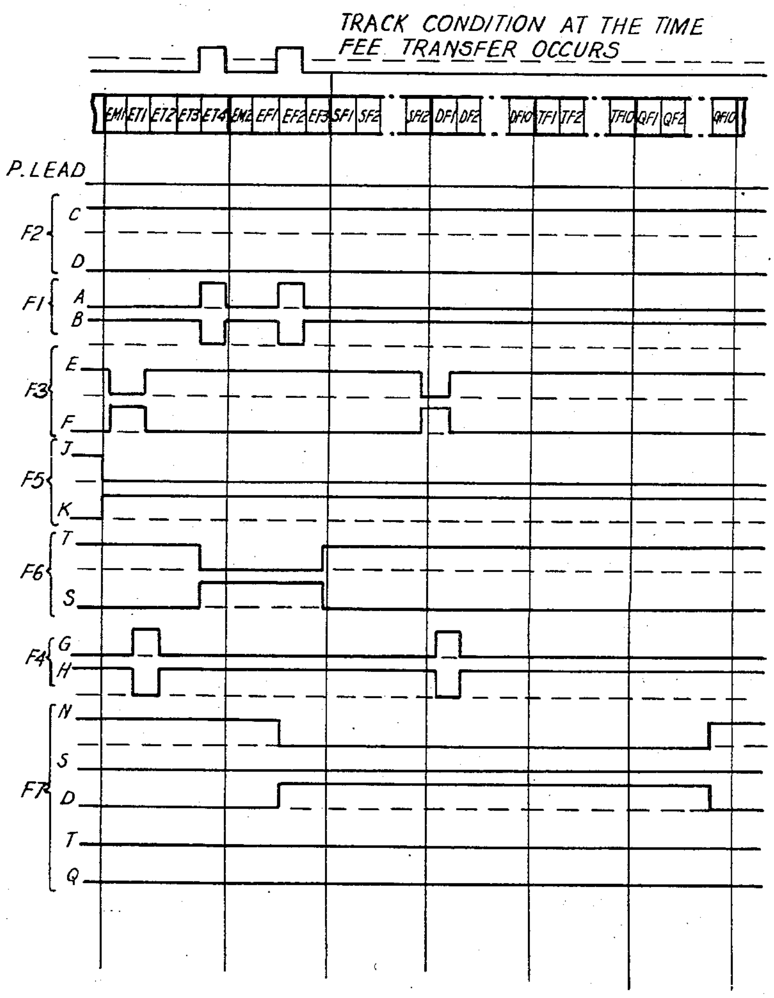
Figure 20:
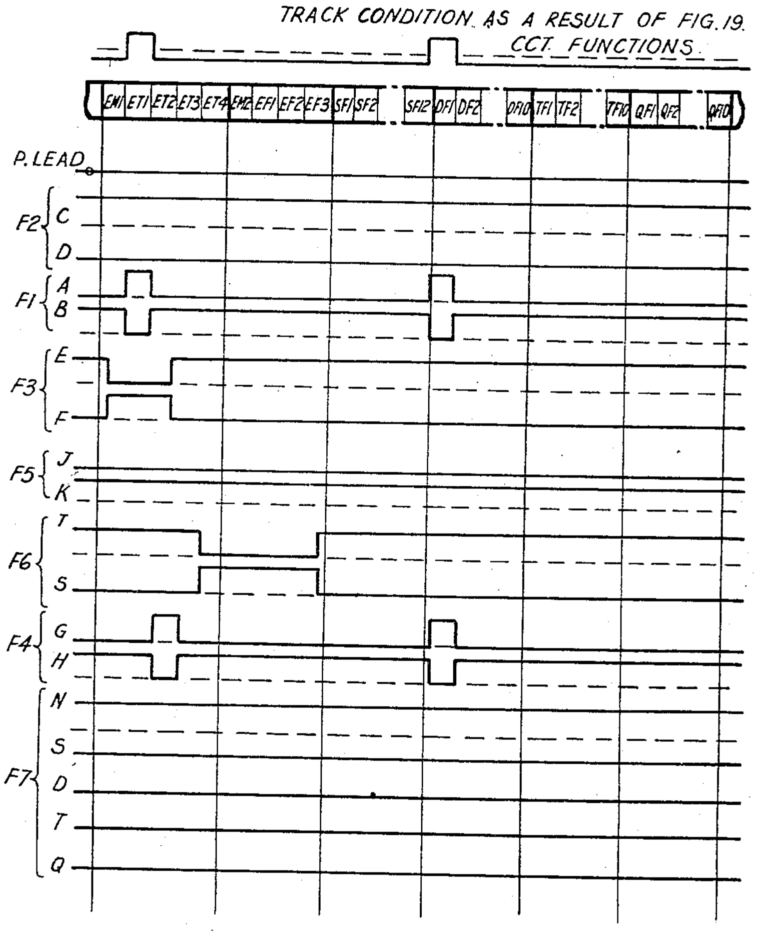

Figs. 19 and 20: transfer of information into the permanent store takes place.

PN is the position pulse used to gate subscribers line circuit N into section N on the magnetic drum, and will assume to be operative each time the track section is passing at the read head. This pulse will be derived with others corresponding from the other sections of a track from a toothed track on the drum, each tooth covering a section.

At time $tm1$ gate G1 will cause F2 to test the P lead of the particular subscribers line circuit being gated in by the position pulse. Assuming condition 1 above, there will be no metering condition present, hence F2 will remain conducting at F2C. Also by virtue of condition 1 element EM1 will cause F1 to conduct at F1B indicating that the track condition is 0. With pulse $tm1$ coincident with F2C and F1B, gate G18 will conduct, in turn causing F5 to conduct at F5K, this indicating no transition of P lead condition. At the time of pulse $t1$, this pulse coinciding with $tm1$ and F2C, causes gate G25 to conduct, and in turn F4 to conduct at F4H, causing a "0" to be recorded. Thus the fact that no meter condition existed on the P lead has caused the special first element E$m1$ of the timing section to be repeated as a "0." Pulse $t1$ in conjunction with F5K will also cause F3F to conduct via gate G4. This circuit element prepares the appropriate gates for the addition of one to the timing elements. It will not cause any circuit function at time $tm1$, as its associated gates in the timing section require waveform WT. At time $t2$ no circuit functions take place, gate G10 in particular being held off by W$m1$.

At the time of element ET1, F1 will be at F1B, pulse $tm1$ has ceased and waveform WT is operative. Pulse $t1$ becoming coincident with WT, F1F and F1B will cause gate G21 to conduct, in turn causing F4 to change over to F4G, and recording a "1." The fact that F1B was conducting showed that the track condition was 0, but due to F3F conducting this has been recorded as one, fulfilling the condition for binary addition (i. e. reversing all elements up to, and including the first 0). Thus with F1 at F1B because of the 1st 0, and W$m1$ present indicating the special element E$m1$ has passed, W$m1$, W$m2$, F1B and pulse $t2$ cause gate G10 to conduct, resetting F3 to F3E conducting. Timing elements ET2, ET3 and ET4, will keep F1 at F1B, but with F3 at F3E, at the time of $t1$ during each element, gate G26, will cause F4 to re-record 0. At element ET4 pulse $tt$ will occur, but as at that time F1 will be at F1B no circuit action will take place. Hence at the end of the timing section the track condition will, as Fig. 2($b$), i. e. the special element E$m1$ will be 0, and one added to the timing elements ET1, 2, 3 and 4.

The timing section is now followed by the temporary store. Master control waves, WT and $tm1$ have ceased and their associated gates become inoperative, the circuit being controlled by $tm2$ and WF.

At time $tm2$, F2 again tests the condition of the P lead, but this time via gate G2, and as for the timing section, F2 remains at F2C. Element E$m2$ is a "C," so F1 will be at F1B. The temporary fee store is only required to operate if there is a condition on the P lead, but with no condition the circuit operation is as follows. Pulse $t1$ becoming coincident with F2C, $tm2$ causes the special first element E$m2$ to be recorded as a "0," via gate G29. The addition circuit will not be initiated as gate G5 requires that F2 be at F2D, i. e. a meter pulse on. Hence elements EF1, EF2, EF3, will be recorded unchanged, in this case as they are 0, F1 will be at F1B, and at time $t1$ of each element, gate G30 will cause F4 to conduct at F4H recording at 0. The track condition at the end of the temporary fee store will be as Fig. 2($b$), i. e. all 0. As there are no conditions in the temporary fee store, no further circuit operations can be initiated, and all the permanent store conditions will be recorded unchanged, via gates G30 and G23. As the permanent fee stores are all at zero in actual fact only gate G30 will be operative. The circuit element waveforms are shown in Fig. 9.

Assuming that still no meter pulse has occurred when this particular track section appears for the second time, the track condition will be as for Fig. 10. The circuit element waveforms are shown on the same drawing. Using the same circuit element as before, special element E$m1$ will be repeated as a "0," F3 set to F3F, F5 to F5K and F2 will be at F2C. The appearance of element ET1, will cause F1 to change over to F1A, and $t1$ coinciding with F1A, F3F and WT will cause gate G27 to conduct, and in turn F4 to record a 0 at F4H. At time $t2$ gate G10 will not conduct due to F1 being at F1A. Element ET2 appearing will cause F1 to change over to F1B, and at $t1$, coincidence with WT, F1B and F3F will cause gate G21 to conduct, changing over F4 to F4G recording a 1. The condition for the addition of one has now been fulfilled and at $t2$ gate G10 resets F3 to F3E, as before. The circuit operation now becomes identical with that described during the first cycle, until this particular track section has passed.

Assume now that condition 2 prevails, and that the first pulse of a double fee appears on the P lead. The first cycle of operation is shown in Fig. 11 together with the track condition after the previous two cycles. A condition on the P lead, becoming coincident with the position pulse, prepares gates G1 and G2 for operation. The first pulse being $tm1$, gate G1 opens causing F2 to conduct at F2D. Gate G3 is held off at this time by WM1. Element EM1 will cause F1 to be conducting at F1B, and there being a transition of P lead condition, $tm1$ coincident with F1B and F2D causes F5 to change over to F5J. This prevents F3 from being changed over to F3F. At time $t1$, this pulse being coincident with $tm1$ and F2D causes gate G19 to conduct and consequently F4G to record "1." The special element EM1 will remain at one as long as the P lead condition persists. The 1st timing element of the timing section appears and with it waveform WT. With the appearance of WT gate G19 becomes inoperative, and at $t1$, WT and F5J cause gate G28 to conduct and in turn F4H to record a 0. This gate will then remain conducting as long as WT persists, and at time $t1$ each element will return to 0, thus erasing any previous intelligence. During this erasure neither F3F nor F5K will be conducting, hence gates G21, G27, G20 and G6 will be inoperative. The timing section of the track having passed, it leaves the track condition such that the special element EM1 is a "1," and the remaining elements at "0." At element ET1 waveform WM1 appears resetting F2 to F2C via gate G3.

The temporary store now follows, and as a metering condition exists it is desirable to record this fact once only in the store. The counting unit used, is like that described in said copending application, and involves the use of a first element (EM2) known as a "chalk mark." The method briefly is that a 1 is added to the chalk mark element, and a 1 to the remaining elements. While the meter pulse persists the chalk mark will prevent any further addition into the temporary fee store. When the pulse ceases the chalk mark is removed, but leaving the one stored in the remaining elements.

If another meter pulse occurs before fee transfer is initiated, the chalk mark is re-added, and one is added to the unit which was already stored. At the end of the second pulse the chalk mark is again removed, leaving the remaining elements with two stored. The addition is in binary form, hence 3 elements EF1, 2 and 3, can store 7 meter pulses, although facilities are only available to use up to 4.

With element EM2 at the read head, F1 will be at F1B. Gate G2 conducts F2 to change over to F2D, and with F5 still at F5J, at time *t*1 the following circuit functions take place. Pulse *t*1 coincident with *tm*2 and F2D causes gate G22 to conduct and consequently F4 to conduct at F4G, recording a 1, i. e. the "chalk mark." At the same time *t*1 being coincident with *tm*2, F1B and F2D causes gate G5 to conduct and hence F3 to change over to F3F conducting. The fact that F3F conducts at *t*1 will not cause any circuit operation, as the temporary fee section gates associated with F3 require WF waveform to operate.

The chalk mark has now been added and EF1 element appears, this will be a 0, and hence F1 will be at F1B. Pulse *tm*2 ceases and wavefomr WF commences, also waveform WM2 reappears. The reappearance of WM2 causes gate G3 to conduct and reset F2 to F2C, and prepares gate G10 to reset F3. Pulse *t*1 coincident with F3F, F1B and WF causes gate G24 to conduct and hence a 1 to be recorded. As this is the 1st 0, by the rule of addition F3 must now be reset. At time *t*2 gate G10 conducts resetting F3 to F3E. The remaining two elements EF1 and EF2 then operate F4, via gates G23 and G30, although as these two elements are "0," only gate G30 will be operative. The track condition is such that EM2 is now a 1, and 1 has been added to the store elements, and this is shown in Fig. 12.

Assume now the drum takes another cycle with the meter pulse still on, see Fig. 12. At element EM1, and time *tm*1, F2 changes over to F2D. The element EM1 is now a 1, and will cause F1 to conduct a F1A, hence when *tm*1, F1A and F2D become coincident, gate G16 will conduct, and subsequently F5K. This denotes that the P lead is stable. At time *t*1, conditions *tm*1, F5K and *t*1 cause gate G4 to conduct, and hence F3 to change over to F3F in preparation for adding one to the timing elements. Pulses *t*1 and *tm*1 with F2D also cause gate G19 to conduct, in turn causing F4 to record a 1 at F4G, thus the 1 on the element EM1 is repeated. The second element ET1 will cause F1 to conduct at F1A, and with F3 conducting at F3F, 1 will be added to the time store. At time *t*1, WT, F3F and F1A gate G27 will conduct and subsequently F4H to record a 0, reversing the element ET1 condition. Also during ET1 F2 is reset by gate G3 in the usual manner. Element ET2 than appears, causing F1 to change over to F1B, and at time *t*1, WT, F3F and F1B cause gate G21 to conduct causing F4 to record a 1. This completes the functions necessary for adding one, and at *t*2 gate G10 conducts resetting F3 to F3E. Circuit operation to the end of the time store is then by usual control gates G20 and G26.

The temporary fee store has already recorded the meter pulse, so circuit operation for this section of the track is as follows. At *tm*2 gate G2 causes F2 to operate at F2D, but as the special element EM2 is now a 1, F1 will be at F1A. Hence the gate G5 controlling the addition circuit flip-flop F3 will be inoperative during *tm*2, whilst *tm*2, F2D and pulse *t*1, ensure that the chalk mark is re-recorded via gate G22. At element EF1 pulse *tm*2 will have ceased so gate G5 cannot operate, and the track intelligence is repeated by gates G23 and G30 to the appropriate sides of F4. As the time store has not reached a point where transfer can take place, the gates G23 and G30 will repeat the permanent stores intelligence unchanged. The track condition is now as shown in Fig. 13.

Assume now that the first meter pulse has ceased, the circuit waveforms are shown in Fig. 13, the circuit operation being as follows:

When element EM1 occurs, there will be no condition on the P lead and hence F2 will be at F2C. Due to the fact that in the previous cycle a meter condition existed, EM1 was a "1" therefore F1 will be at F1A, hence F1A, F2C and *tm*1 cause gate G16 to conduct, and consequently F5 to change over to F5J, denoting a transition of the P lead condition. The effect of F5J operating is to block the operation of gate G4, and thereby F3, thus inhibiting the addition circuit. At time *t*1 this pulse coincident with *tm*1 and F2C, causes gate G25 to conduct and subsequently F4H to record a 0. This has removed the "1" from element EM1, which will now remain as 0, until another meter pulse occurs. During the next element ET1 pulse *tm*1 ceases and WT appears, and at time *t*1, of each element F5J and WT will cause F4 to record a 0, thus erasing the time store intelligence. Gates G21, G20, G26 and G27 will be inoperative due to the fact that neither F5K or F3F is present. By these means at the end of the time store, the special first element EM1 has been changed to 0, and the remaining intelligence erased.

The meter condition having ceased, it is now desirable to remove the "chalk mark" from the temporary fee store. F1 will be at F1A due to element EM2, F2 will be at F2C, and F5 at F5J. Once again the addition circuit is inhibited at gate G5, by virtue of F1A, but at time *t*1, pulse *t*1, *tm*2 and F2C cause gate G29 to conduct, and F4 to record a "0," erasing the chalk mark. As element EM2 passes *tm*2 ceases and gate G29 becomes ineffective. At element EF1, F3 will remain at F3E, WF appears and the track intelligence denoted by F1 is repeated unchanged by F4 and gates G23 and G30, until the end of the track section. Thus at end of the 1st cycle, the temporary fee store has no chalk mark and one is stored in the remaining elements, the track condition being shown in Fig. 14.

During the second revolution of the drum the time store will add one, and the temporary fee store will remain unchanged, the circuit operation being identical with Fig. 10, except that now the temporary fee store contains 1.

Assume now the second meter pulse arrives, by methods previously described, at element EM1, F1 will be at F1B, F2 at F2D, and F5 will change over to F5J. As before, this will cause one to be added for the first element EM1 and erase the previous timing. In the temporary fee section the chalk mark will be re-introduced and one added to the already existing unit. These circuit operations use the same gates and are identical with the circuit functions described for the 1st pulse. Thus at the end of the first cycle the timing store has the 1st element 1, the timing elements re-set to 0, and temporary fee store has a chalk mark added and the store elements contain intelligence in the form of binary two indicating two pulses. The track condition is shown in Fig. 16, and the circuit element waveforms in Fig. 15. The waveforms for another cycle of operation are shown in Fig. 16.

The end of the 2nd pulse track conditions will be as Fig. 17. Figs. 17 and 18 show two cycles after the second pulse has ceased. Operation for Figs. 16, 17 and 18 are identical, with those described for Figs. 12, 13 and 14, except that the temporary fee store contains intelligence, indicative of a double fee.

Assuming now no further P lead transitions occur the timing section will continue adding one for each revolution, and supposing each drum revolution takes 100 ms. then each unit added is a direct indication that this time has elapsed. Hence, when the drum has completed 8 revolutions, binary 8 will be stored in the time store. Binary 8 is the 1st value which will cause a 1 to be stored on element ET4. With the maximum expected variation in meter pulse lengths it is reasonable to assume that if no P lead transitions have occurred in 800 ms., then no more will occur in a given sequence of meter pulses, and that the temporary fee store intelligence should be transferred to the appropriate permanent store. Thus when ET4 causes F1 to conduct at F1A, this coinciding with pulse *tt* initiates the fee transfer in the following manner. Fig. 19 shows the cycle of operations when this stage is reached.

Track element ET4 will cause F1 to be at F1A, and pulse *tt*, coinciding with F1A causes gate G36 to conduct and consequently F6 to conduct at F6S. The function of F6 is to transfer the information from the temporary fee store, to the temporary fee memory which it does in the following manner. The binary pattern set up on elements EF1, EF2, EF3, will be detected by F1. Pulses *tf*1, *tf*2 and *tf*3 in conjunction with F1A, cause the section of F7, representing the decimal equivalent of the binary pattern to conduct. The same time as the intelligence is transferred from the temporary store elements, it is also erased, thus on the completion of transfer, the temporary fee store elements are all at 0.

The binary pattern on the elements EF1, 2 and 3 is 010, hence as the drum rotates F1 will conduct at F1B, F1A and again at F1B. At the time of element *tm*2, this pulse being coincident with F2C and *t*1, gate G29 conducts and consequently F4 records 0 at F4H. With element EF1 present F4H will still conduct due to gate G30, no erasure being necessary as the track condition was already 0. Pulse *tf*1 will cause no function of F7, via gate G32 due to F1 being at F1B.

Element EF2 will be a 1, hence *tf*2, F6S, F7N and F1A will cause section D to conduct. The fact that F1A is conducting would normally try to change over F4 to F4G via gate G23, but due to F6T the gate will be inoperative, hence F4 will remain at F4H, and the intelligence erased. Element EF3 and *tf*3 will cause no further circuit operation as F1 is at F1B. The circuit condition at EF3 is then, that the track intelligence has been erased and F7 is operated in such a manner, that its output from D is direct indication to which permanent store one shall be added.

For completeness, with the circuit operation as visualised at the moment, there are four separate conditions which will operate F7 i. e. single, double, treble or quadruple fee intelligence stored in the temporary fee store.

For single fee elements EF1, EF2 and EF3 will cause F1 to conduct at F1A, F1B, F1B. The section N is normally conducting. Hence at EF1, *tf*1 and F1A and F6S operate gate G32, and section S only fires, its output initiating the addition of one into the single-fee store.

For a double fee F1 will be at F1B, F1A, F1B hence F1A, *tf*2, F6S and F7N cause gate G33 and consequently section D of F7 to conduct. F7N indicates that at *tf*1, F1 was at F1B hence the track intelligence was binary 2 i. e., 010. Section D output initiates the addition of one to the double fee store.

In the case of the treble fee call, for binary 3, both EF1 and EF2 will be at 1, hence F1 will be at F1A, F1A and F1B. At *tf*1 section S will conduct as for single fee, but at *tf*2. F7N is inoperative, hence *tf*2, F7S and F1A cause section T to conduct thus initiating the addition of one into treble fee store.

For the quadruple fee, binary four will be EF3 only at one, hence F1 will be F1B, F1B, F1A. The two first elements will therefore cause gates G32, G33 and G34 to be inoperative. At the time of pulse *tf*3, F6S and F1A will cause gate G35 to conduct and initiate the addition of one into the quadruple fee store. There is no reason why this circuit should be limited to 4 condition, and depending upon the maximum value of the binary number to be stored in the temporary fee store, so sections can be added to F7. Continuing with the transfer of the double fee, at *tf*3 and time *t*2 gate G37 conducts resetting F6 to F6T, hence as the final section of the temporary fee store passes, gate G23 is unblocked, and F4 and its associated fee section gates will be normal. If the fee had been single, as previously explained *tf*3 has a double purpose, and at *t*2 and with F7S, *tf*3 would have caused G5 to operate, causing F3F to conduct and add one in the manner previously explained. The double fee in question, has caused F7D to conduct and at time *t*2 of the element SF12 of the single-fee store, *tdf* causes gate G7 to conduct, and F3F to add one to this section. For treble fee *ttf* and F7T operate gate G8, and for quadruple fee *tqf* and F7Q operate gate G9. The two gates initiate the operation of F3F and hence the addition of one into the appropriate store.

The track condition is shown in Fig. 20.

Also at the time of the final element, a pulse *te*, denoting the end of the track section causes F7 to be re-set at F7N.

Gates G11, G12, G13 and G14 are used to reset F3 should all the elements in one store be at 1. If this were the case, then gate G10 would be inoperative, and one would be added to the next store. Thus if addition is made to the single fee store at the time of the final element and F3 is not reset, *tdf* which occurs in coincidence with this element will at *t*2 cause gate G11 to conduct, and in consequence F3E, thus overcoming the above problem.

F7D and *ttf* cover this function for double fee at gate G12. F7T and *tqf* cover the treble fee section at gate G13 and *te* resets F3 for the quadruple fee. If no limit were placed on the amount of meter pulses to be received by the temporary fee store in one operation, then a gate of this kind may be required for this section of the track.

At the end of the transfer cycle, the temporary fee store is at zero, and the appropriate permanent record store greater by one. The circuit is ready for the addition of another set of meter pulses.

Fundamentally the circuit elements used in Figs. 21–29 are similar to those used in the single track circuits. The disadvantage with the single track scheme is the large number of track elements required by one subscriber; in the actual circuit described the number is 51. Such a large number of elements considerably reduces the number of subscribers per track.

In the scheme about to be described, four tracks are used for permanent record fee stores, and a fifth for the timing and temporary fee store. The number of elements used by this scheme is slightly greater than for the single track, but the peripheral length occupied by one subscriber is considerably less, amounting to 22 elements. As the timing and temporary fee stores must precede the permanent record stores, but occupy different tracks, it is possible to get some overlap of successive subscribers track sections, as shown in Fig. 1. Using this overlap the effective peripheral drum length occupied by one subscriber is 16 elements, thus the multi-track scheme gives approximately three times the number of subscribers around the drum compared with the single track scheme.

The amount of common equipment required to control the five tracks of the multi-track scheme, is slightly larger than that required for one track of the single track scheme. Read, record, and two control, flip-flops are required by the control circuit, and eight extra amplifiers in the track circuits. The reason why only four extra circuit elements are required to control the four fee record tracks, is because it is only necessary to modify the intelligence in one fee track, for any given meter operation. The timing and temporary fee tracks are used to gate these elements into the appropriate track, in much the same way as, in the single track scheme, temporary fee store intelligence is gated into the appropriate track sub-division.

By the use of the gating conditions available for the above circuit functions, it is possible to effect some saving in the extra track circuit amplifiers. This can be achieved by the use of single valve pre-amplifiers for the read and record heads, the inputs and outputs of these being gated to and from common amplifiers. It may ultimately be possible to gate the input and outputs of the track directly to and from the common amplifiers.

Despite the extra circuit elements, the multi-track scheme still represents over a number of subscribers, a considerable saving in common equipment. This is more clearly shown by the following table, comparing the common equipment necessary for approximately 200 subscribers. Assume for the purpose of comparison that the single track requires 50 elements, the multi-track scheme requires 16 elements and that the periperal length of the drum is 1600 elements.

| | Single track | Multi track |
|---|---|---|
| No. subs | 192 | 200. |
| No. tracks | 6 | 10. |
| Control circuits | 6 | 2. |
| Track circuits | 6 | 4+16 single valve preamplifiers. |

The greatest single saving is in the control circuits, although some small saving may be made in the track circuits. It is appreciated that the multi-track scheme does not give a 100% utilization of the available drum surface, but it is felt that compared with common equipment costs, track space is comparatively cheap. It would be possible to utilise the whole of the track by some increase in the common control circuits.

The addition and timing techniques are identical with those previously described for the single track circuits.

The following is a description of the circuit elements and their function in the ensuing circuit description.

Read flip-flop F1 responds to the intelligence drawn from the drum, the A side conducting indicating that a "1" has been stored, and the B side indicating a "0."

"P lead" condition flip-flop F2 indicates to the control circuit the condition of the P lead. The D side conducting shows the presence of a meter pulse, while the C side conducting denotes the absence of a meter pulse, or that the flip-flop has been re-set from indicating such a pulse.

Addition control flip-flop F3 is part of the addition circuit, and is arranged so that, with the F side conducting, the drum intelligence indicated by F1 shall be recorded in reverse. With the E side conducting the intelligence will be recorded unchanged.

Record flip-flop F4 with its associated gates, is arranged to control whether the intelligence recorded shall be digit "1" or digit "0." The G side conducting records digit "1," and the H side digit "0."

Change of "P lead" condition flip-flop F5 indicates with the J side conducting that a transition of the P lead condition has occurred. The K side conducting indicates that "P lead" condition is stable.

End of timing flip-flop F6 is operated when the intelligence in the time store reaches a critical value such that ET4 is a "1." This in conjunction with the *tt* pulse causes F6 to operate on the S side, and initiate temporary fee store intelligence transfer. After initiating this circuit function F6 is reset to the T side.

Temporary fee store memory F7 is a five position multi-stable register, each element of which is particular to a permanent fee store. Thus when transfer occurs, the intelligence in the temporary fee store causes the appropriate element to conduct, preparing the gates of the appropriate fee track to open at the time of waveform WA. The drum system used is continuous read and record on diametrically opposite positions on the drum: hence fee transfer will have to take place twice to ensure both track halves are modified. During the second transfer F7 will retain the temporary fee store intelligence until the appropriate track appears, allowing the store intelligence to be erased.

N=normal position.
S=controls single fee track.
D=controls double fee track.
T=controls treble fee track.
Q=controls quadruple fee track.

The purpose of the intelligence transfer control flip-flop F8 is to ensure that both halves of the permanent record tracks are modified, and is operated by the fact that the special element E*m*2 is a "1" and that fee transfer has been initiated, i. e. F6 is at F65. The V side conducting permits normal recording of the temporary fee store intelligence, but causes F12 to initiate the addition of one into the appropriate permanent record track. The U side conducting inhibits the normal temporary fee store recording circuit gates, and causes erasure of the intelligence, but F12 operation will be inhibited. Hence the second half of the track is modified to be identical with the track intelligence modified during the first cycle of fee transfer.

Fee record read flip-flop F9 serves the same purpose as F1 except that its drive circuit is gated from the particular track circuit being modified. The N side conducting indicates the track intelligence is "1," and X side indicates that the track intelligence is "0."

Permanent fee record track record flip-flop F10 serves the same purpose as F4, but its output is gated into the appropriate track being modified. The Y side conducting causes a "1" to be recorded and the Z side an "0."

Permanent record fee track addition control flip-flop F11 is used for the same purpose as F3, and with the L side conducting causes an inverse recording by F10 of the intelligence indicated by F9. The M side conducting permits unchanged read and record by F9 and F10. The flip-flops F8, F9, F10 and F11 are the extra circuit elements added for the purpose of multi-track fee recording.

The control waveforms used in the circuit are listed below, with a brief description of their circuit functions.

P1 is the multiplex or position pulse and is used for gating the associated subscribers line circuit into the appropriate section of timing and temporary fee store track. ***tm*1** initiates the circuit operation peculiar to the special element E*m*1 of the timing section and is also an integral part of master control wave for the timing section. WT in conjunction with ***tm*1 is the master control wave for the period which the timing section circuit elements are in operation. The following gates associated with these circuit functions are inoperative without one of these two waveforms: G1, G5, G6, G8, G9, G10, G11, G12, G13, G14, G19, G20, G21 and G22**. In the ensuing circuit description these gates must be assumed inoperative, when the waveforms are not present.

*tt* initiates temporary fee transfer, in conjunction with element ET4 the *tm*2 pulse in conjunction with special element EM2 controls F8, ensuring that fee transfer takes place on both halves of the track circuit. Waveform *tm*3 is peculiar to the circuit functions associated with EM3 the first element of the temporary fee store. Also, with waveform WF, it forms the master control waveform for the temporary fee store circuit functions. WF in conjunction with *tm*3, forms the master control waveform for the temporary fee store circuit elements. The majority of gates associated with these circuit functions are inoperative. In the ensuing circuit description the following gates must be considered inoperative without one or the other of these waveforms: G1, G4, G7, G16, G17, G18, G24, G25, G26 and G27.

Pulse *tf*1, in conjunction with a "1" being stored on element EF1 in the temporary fee store, will cause section S of F7 to conduct at the time of fee transfer. Pulse *tf*2 will cause section D of F7 to conduct in conjunction with a "1" being stored on element EF2. If "1" has also been stored on EF1, *tf*2 will cause section T of F7 to conduct. Pulse *tf*3, in conjunction with a "1" being stored on element EF3, will cause section Q of F7 to conduct.

Pulse WA is the master control waveform for the permanent record fee tracks, and covers the period for which these pass the read heads associated with these tracks. All the gates associated with the record flip-flop output switching, are inoperative without this waveform.

The narrow switching pulses *t*2, *t*3 initiate the various circuit functions, within the period of one element. Assuming the length of one element is T, then from the commencement of an element, *t*2 will occur in approximately T/3, and *t*3 in approximately 2T/3. Hence *t*2 can be used to set up the circuit functions for the modification of the track intelligence, and the preparation of the record circuit. Pulse *t*3 can be used to complete the recording process, and also in the time of one element, reset any circuit function initiated by *t*2, as may be desired.

Figure 21:
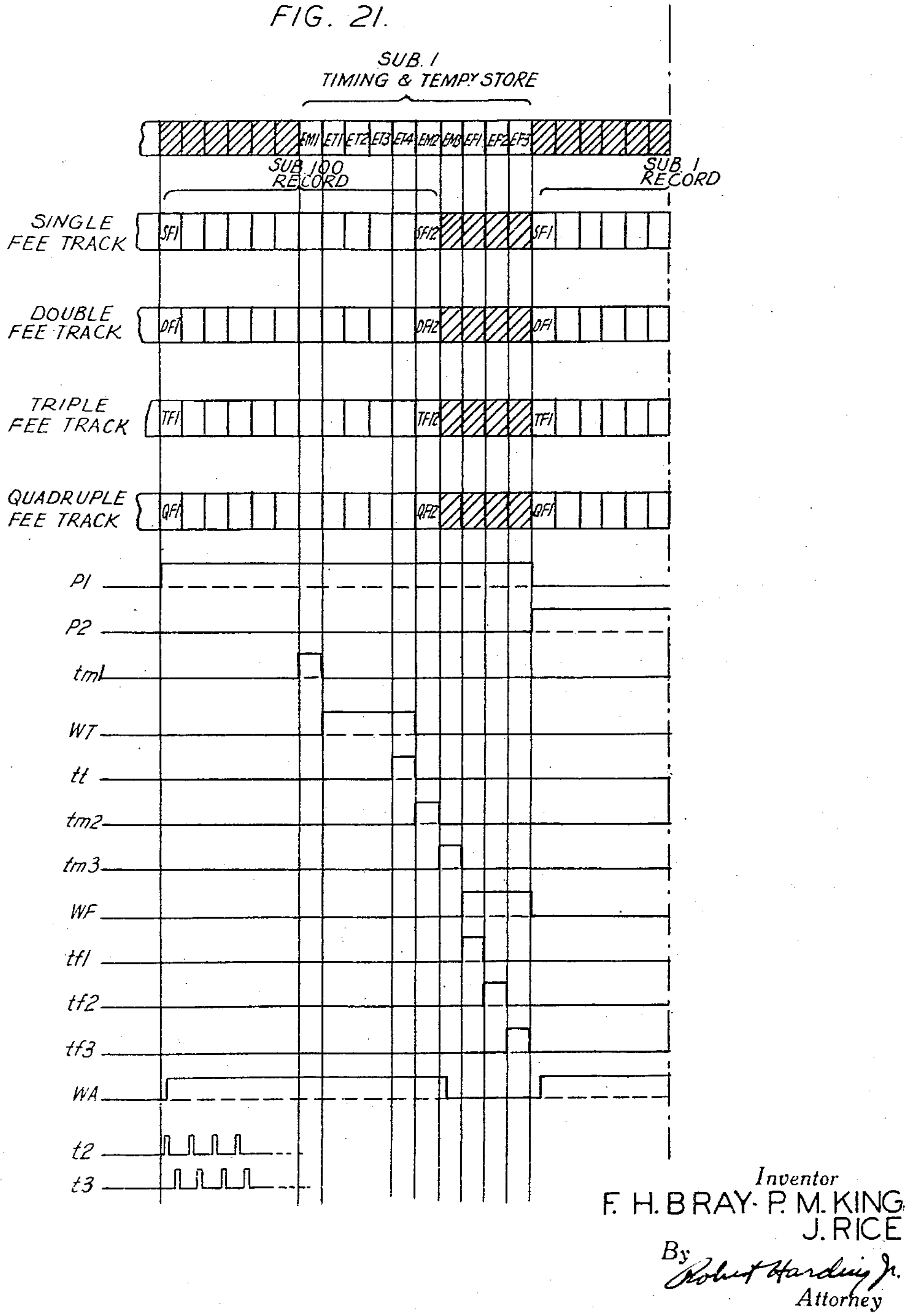
Figure 22:
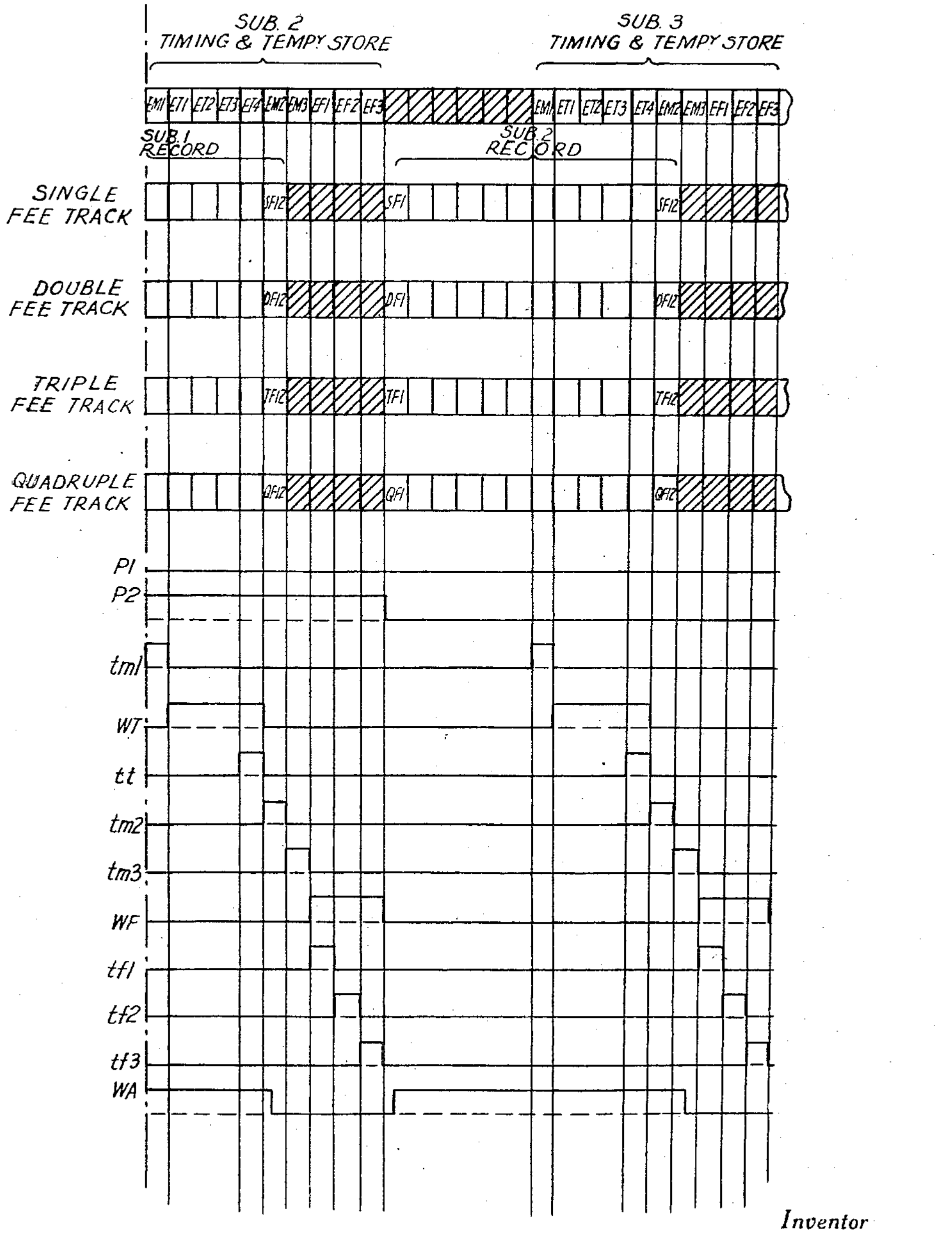
Figure 23:
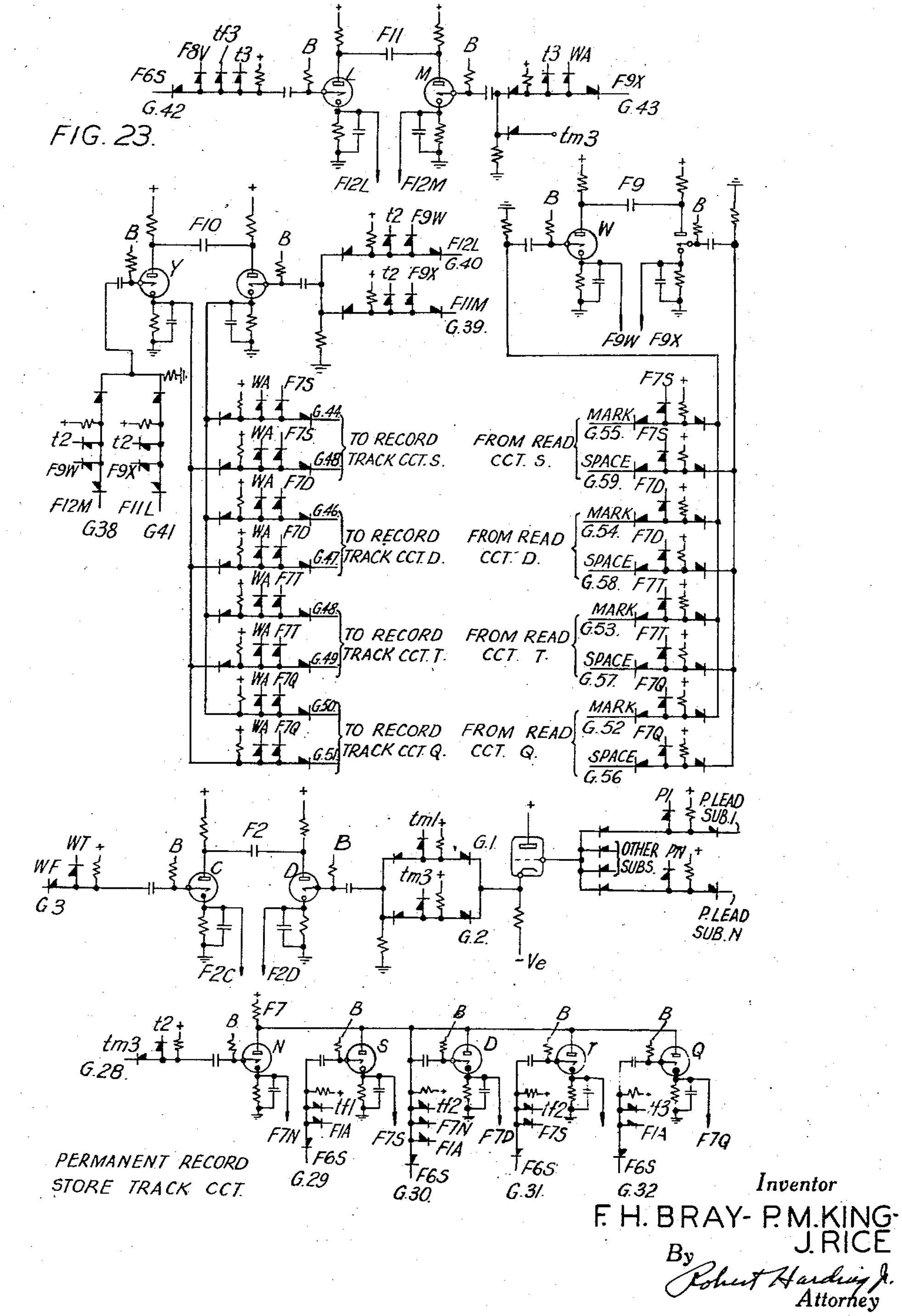
Figs. 23–26 show detailed circuits of a common equipment controlling storage and storage modification on said five tracks.
Figure 24:
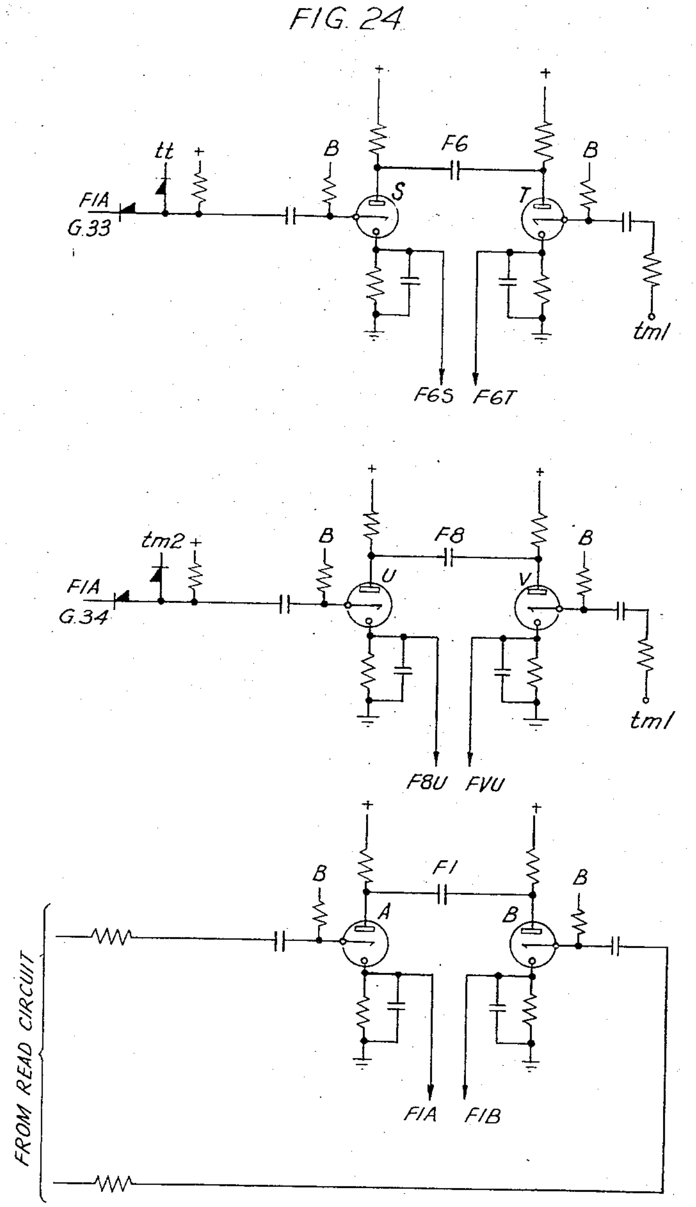
Figure 25:
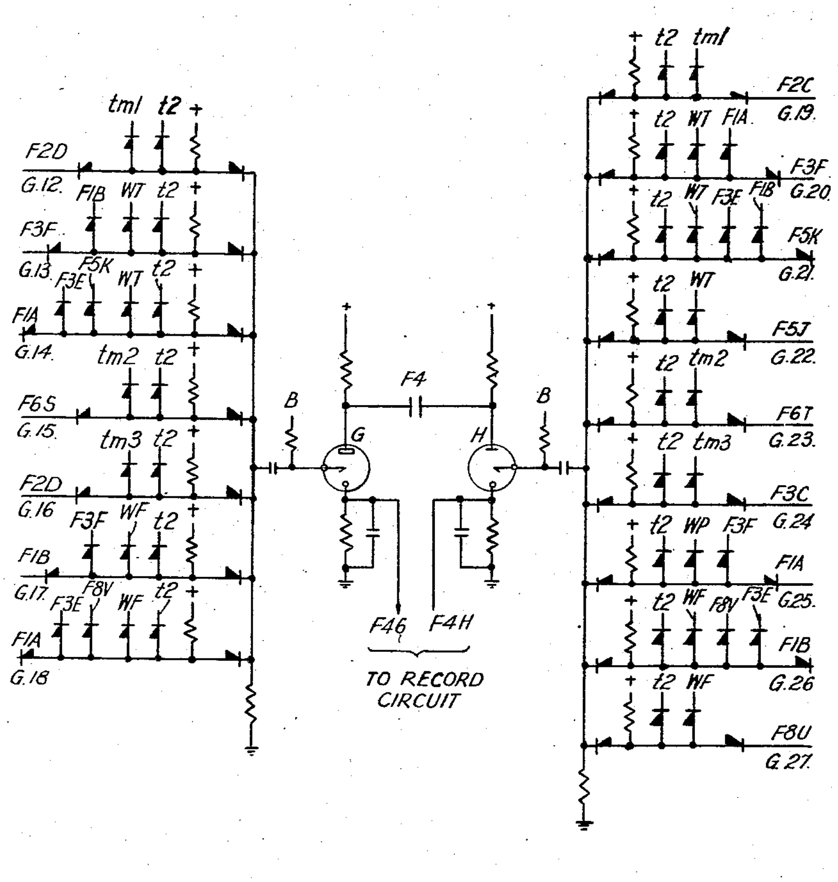
Figure 26:
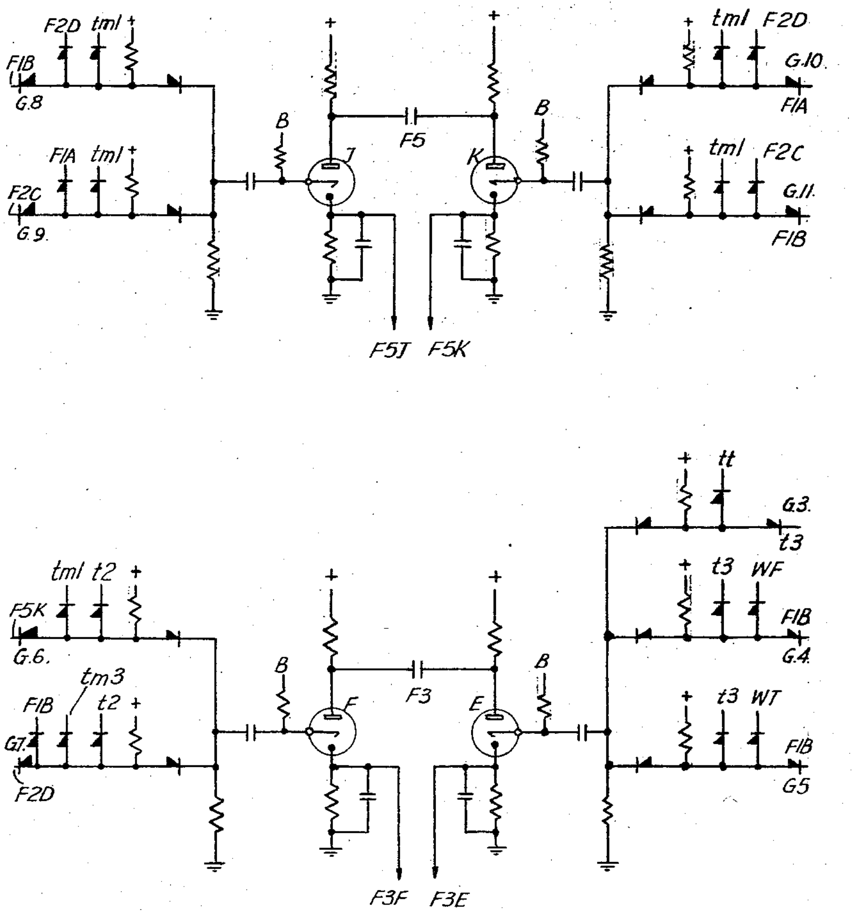
Figure 27:
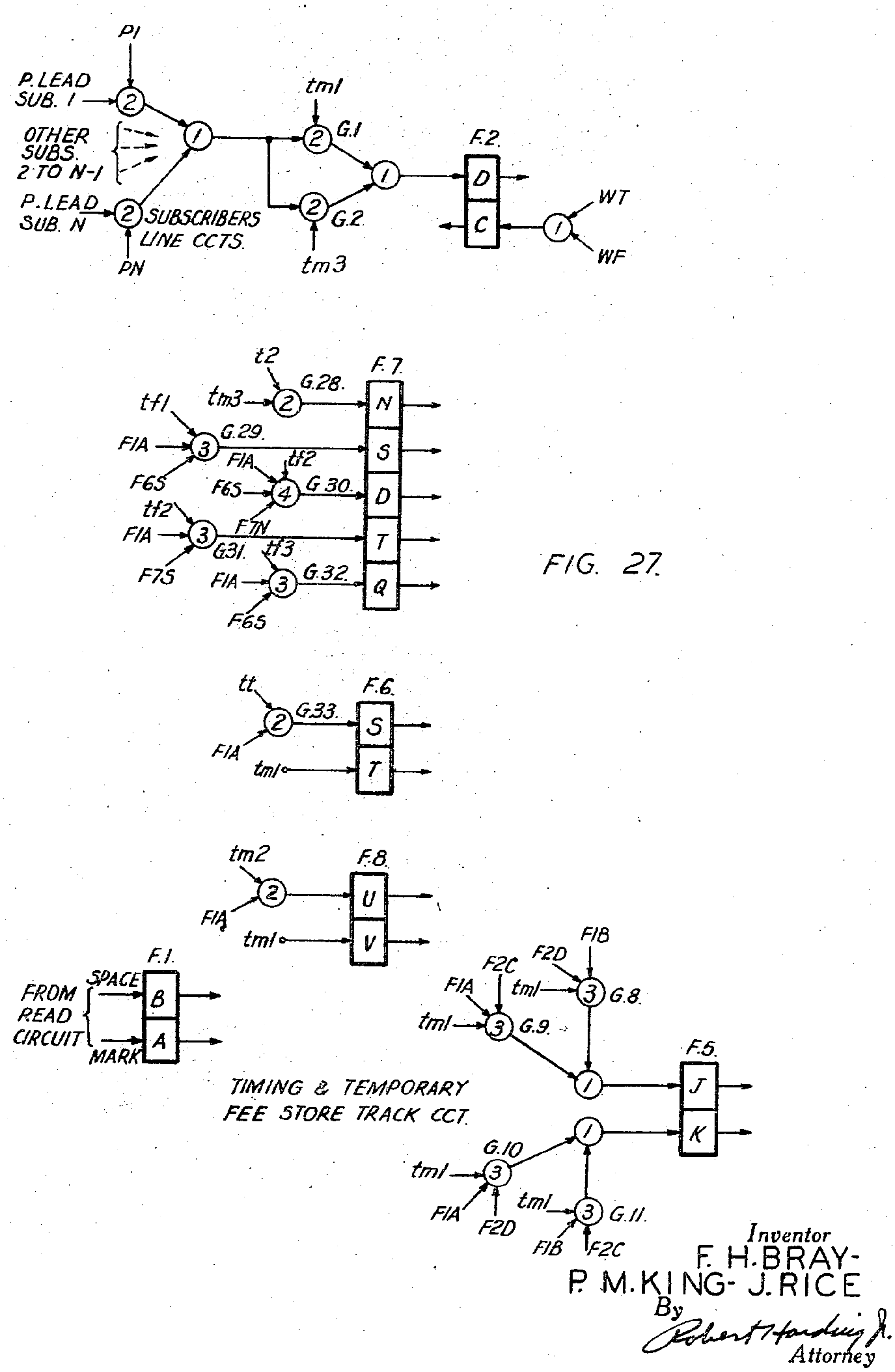
Figs. 27, 28 and 29 show the functional symbol equivalents of Figs. 23–26.
Figure 28:
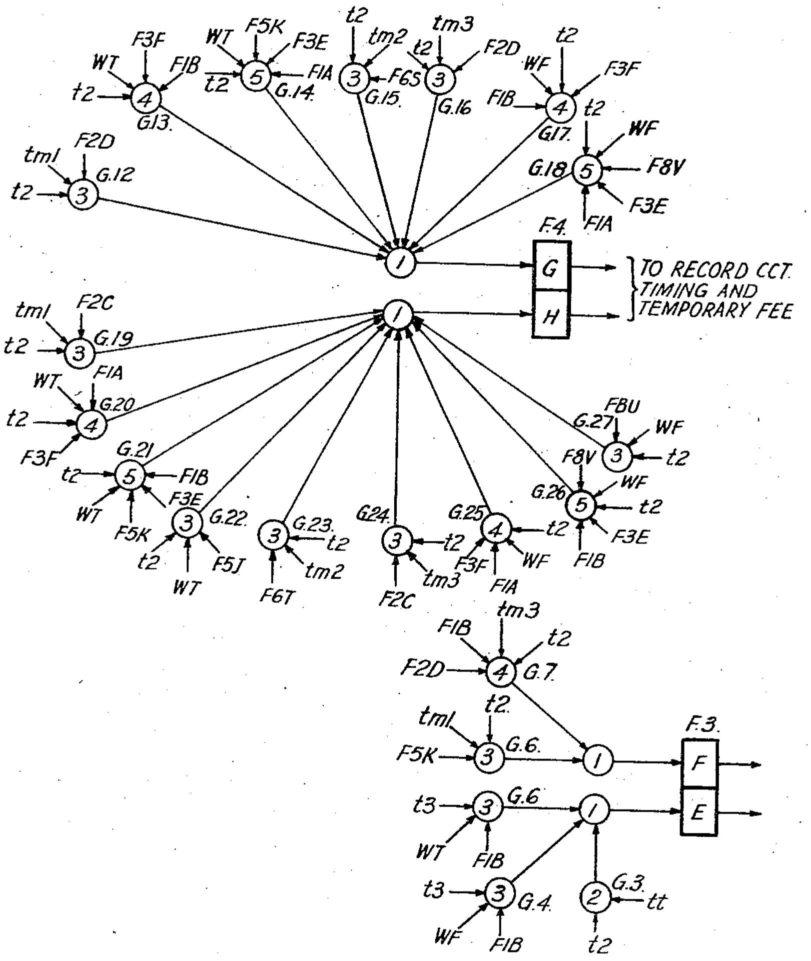
Figure 29:
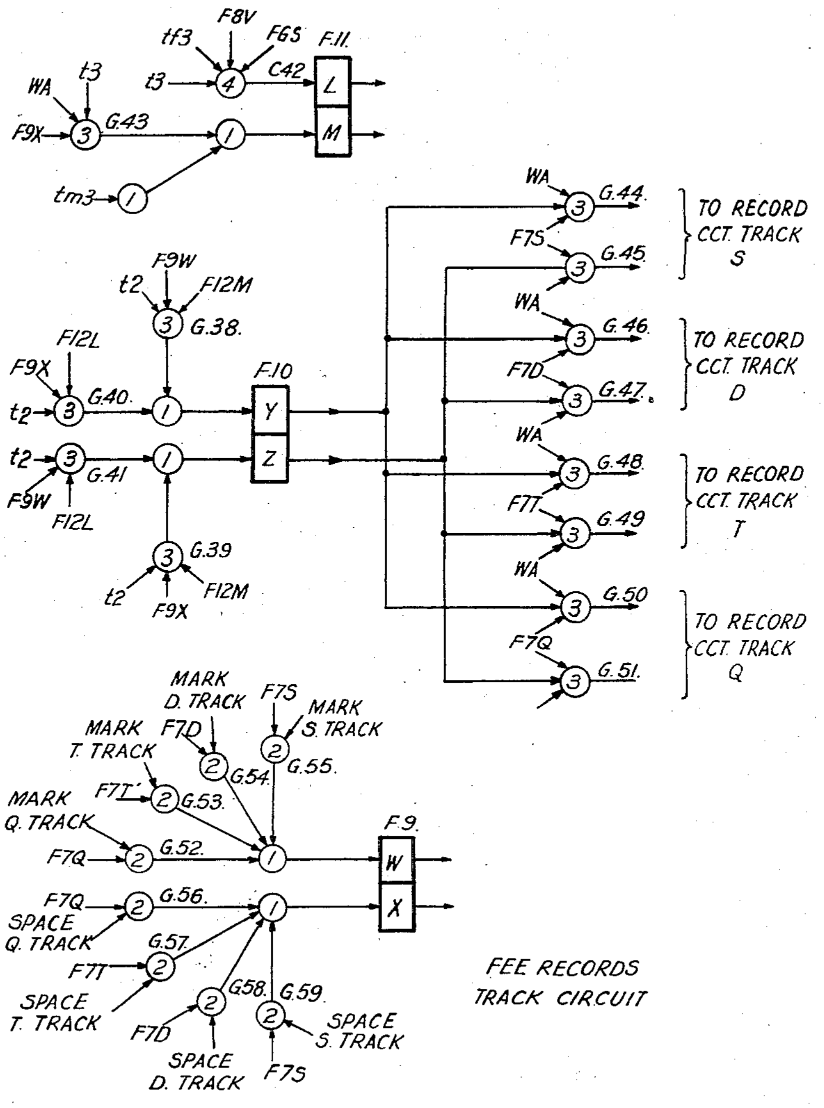

A diagram showing the relationship of these waveforms, and their disposition with respect to the track layout is shown in Figs. 21 and 22.

Figure 31:
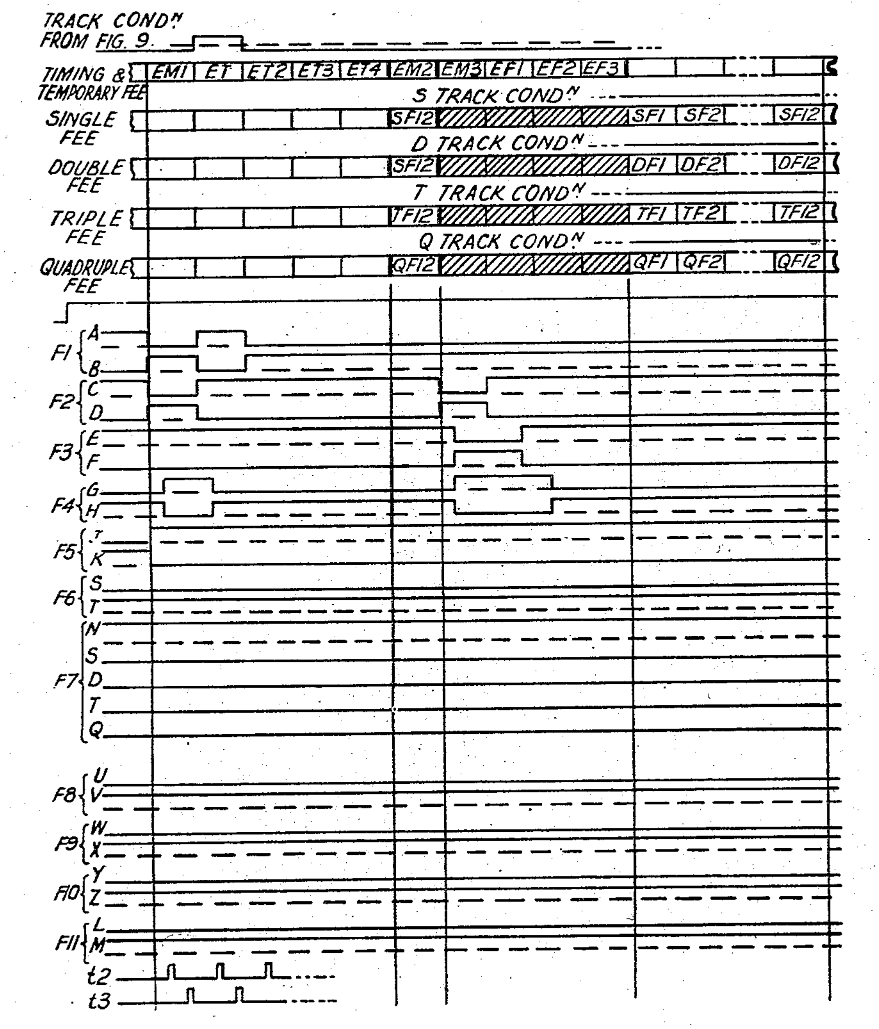
Figure 32:
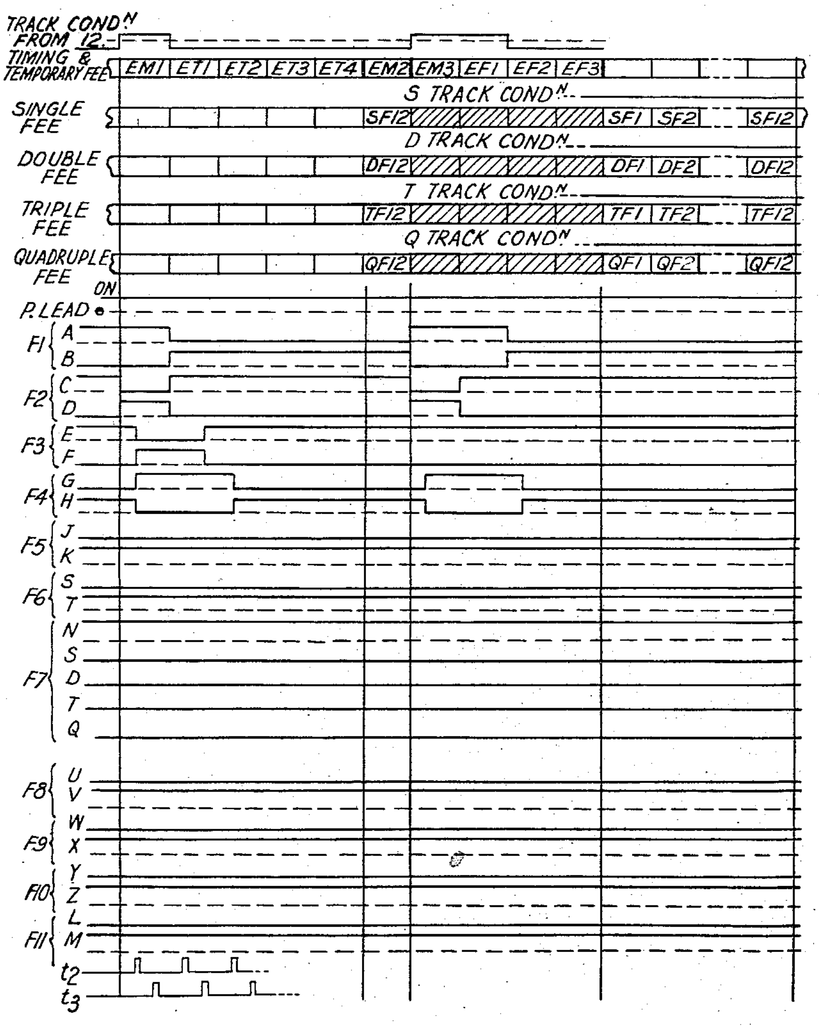
Figure 33:
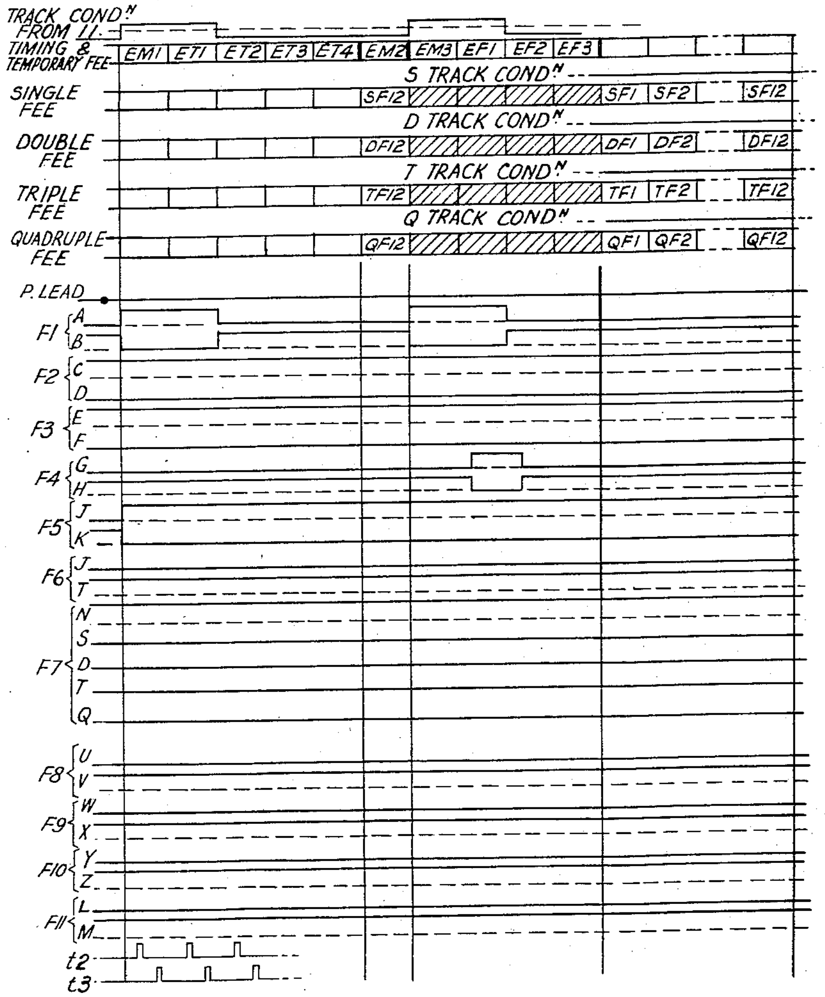
Figure 34:
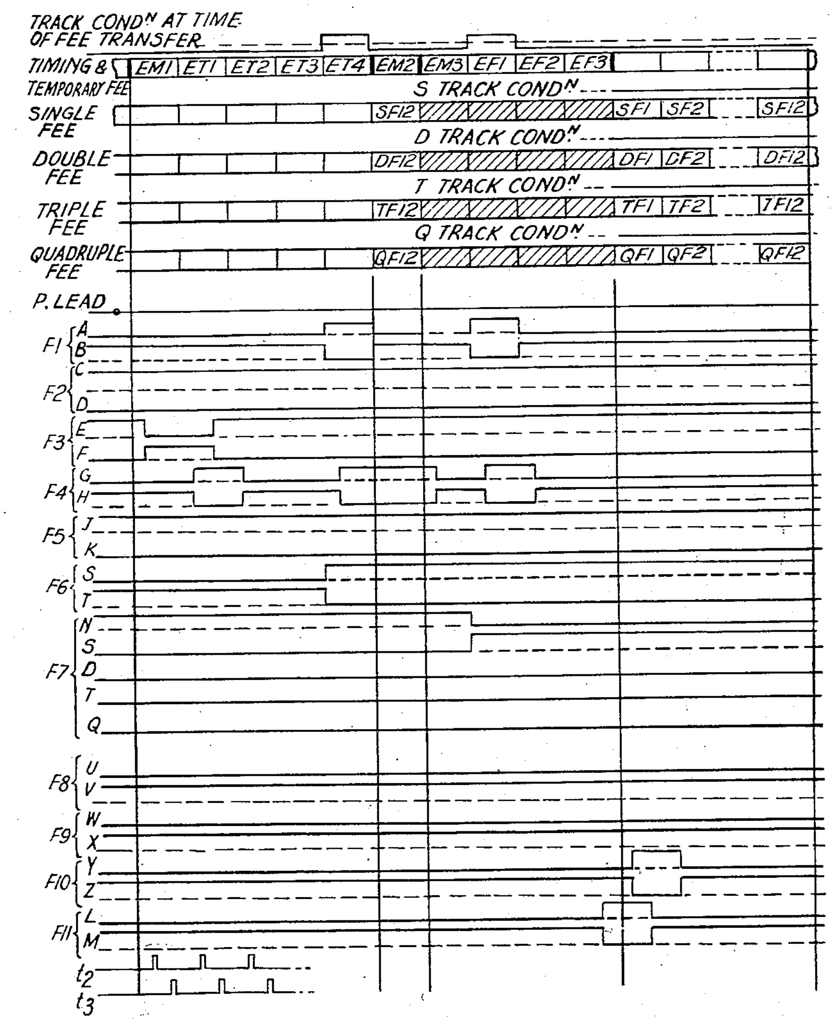
Figure 35:
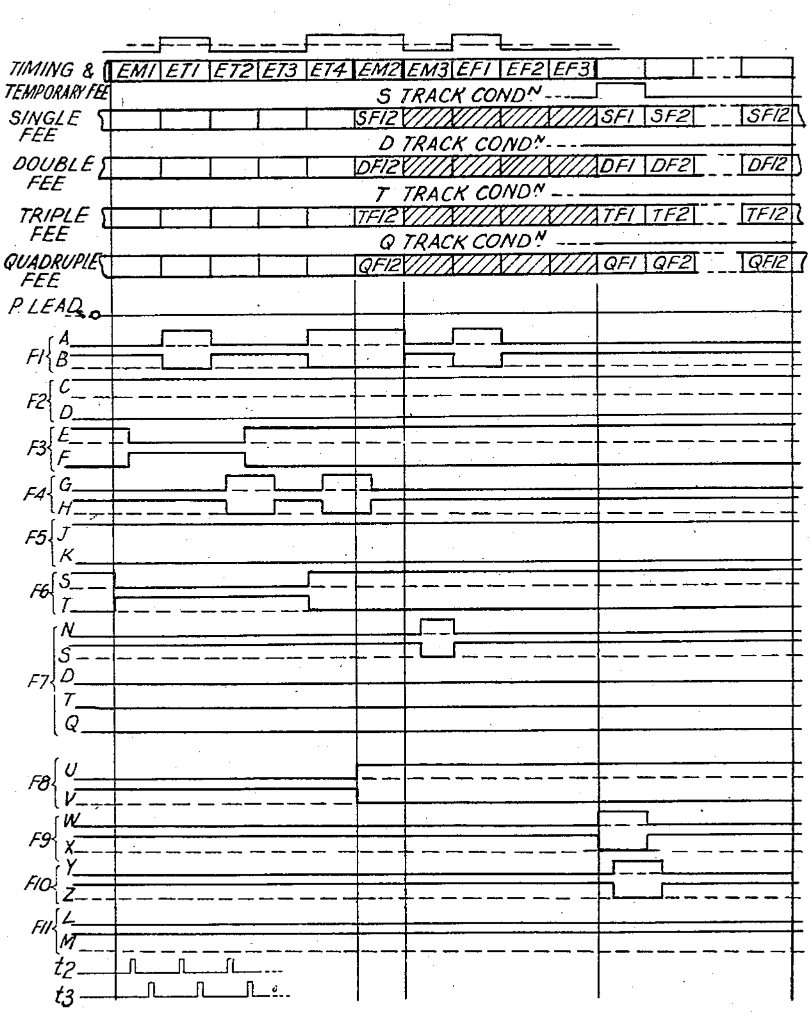

A circuit description of detection and storage of multimetering signals will now be given with reference to Figs. 23–29. The operations described are diagrammatically illustrated in Figs. 30–35 in which the operations when no condition exists on track or P lead are shown in Fig. 30, the operations when a meter pulse arrives are shown in Figs. 31 and 32, the operations when a meter pulse ceases are shown in Fig. 33, while the operations for fee transfer are shown in Figs. 34 and 35.

Figure 30:
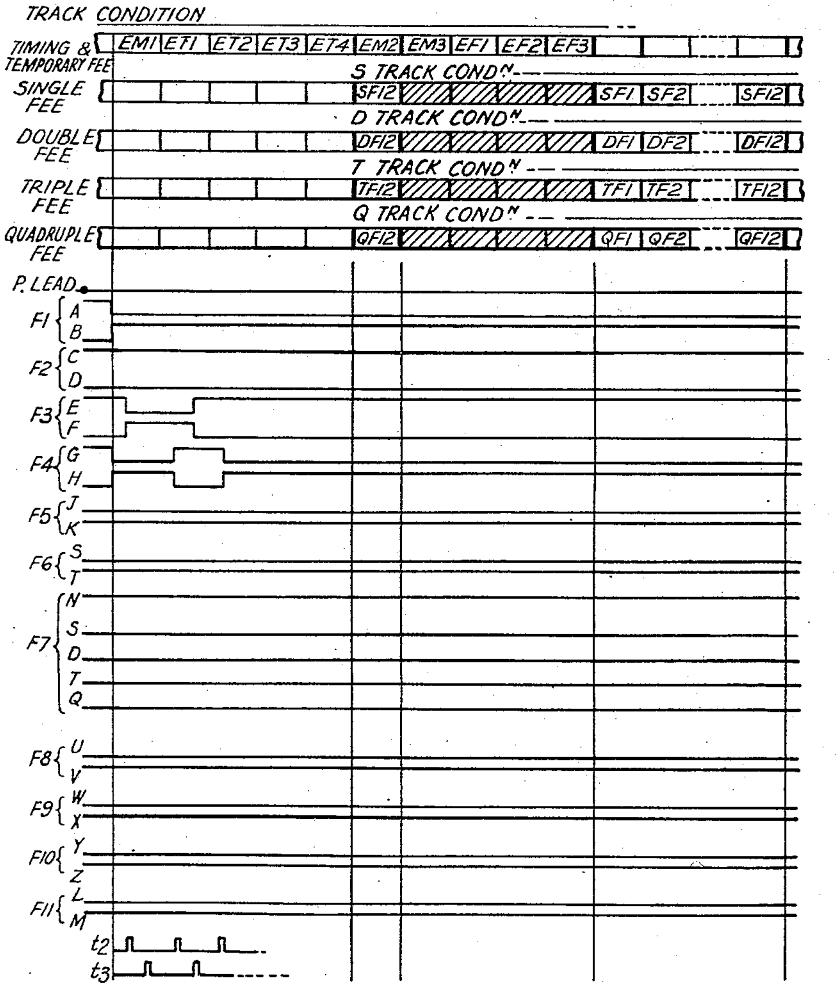
Figs. 30–35 show the sequence of operations of the flip-flops F1—F11 of the circuits shown in Figs. 23–29 during successive rotations of the magnetic drum during storage of a metering fee.

Referring first to Fig. 30 subscriber 1 track sections appear at the read head during position pulse P1. At the time of element E*m*1, gate G1 and hence F2 test the subscribers "P lead" for a meter condition. As there is not P lead condition, F2 remains with F2C conducting.

Due to the fact that there is no condition on the track, element E*m*1 will cause F1 to be conducting at F1B. This condition becoming coincident with F2C and *tm*1, will cause gate 11 and consequently F5K to conduct. As for the single track scheme, when the "P lead" is normal, it is required that the special element EM1 should remain at 0, and this is achieved at *t*2 by *tm*1, *t*2 and F2C causing gate G19 to conduct and hence F4H to record 0. Also pulse *t*2, with *tm*1 and F5K will cause gate G6 to conduct and consequently F3 to change over to F3F, this preparing the timing elements ET1, 2 and 3, for the addition of 1. At the time of element ET1, waveform *tm*1 ceases and waveform WT commences, this causes gate G3 to conduct, but as F2 is already at F2C no circuit function takes place. Again by virtue of condition No. 1, ET1 will cause F1 to conduct at F1B, hence pulse *t*2 becoming coincident with WT, F3F and F1B causes gate G13 to conduct and subsequently F4G to record a 1. This fulfills the requirements for the addition of one, hence at the time of pulse *t*3, this pulse being coincident with WT and F1B, causes gate G5 to conduct, and consequently F3 to be reset to F3E. The fact that F3 has been reset stops the addition circuit operating and the condition of element ET2 and 3 will be repeated unchanged, by gates G14 and G21, although by virtue of the actual track conditions only gate G21 will be operative.

The timing section has now passed and waveform WT has ceased, the next element being EM2. This is a special element, the circuit function of which is peculiar to the fee transfer circuit operation and will be described later. Element EM2 having passed, the next is EM3, the special "chalk mark" element of the temporary fee store. At this time waveform *tm*3 appears causing F2 to again test the "P lead" via gate G2, the flip-flop still remaining at F2C. As there is no meter condition it is desired to keep the "chalk mark" element at 0, this being achieved in the following manner. Flip-flop F1 will be at F1B, and hence pulse *t*2 becoming coincident with *tm*3 and F2C, causes gate G24 to conduct and in turn F4H to record "0." The remaining temporary fee store elements are then repeated unchanged by F4 via gates G26 and G18, although the track conditions are such in this case, that only gate G26 will be operative. At the end of the temporary fee store waveform WF ceases, and the track circuit operation has finished, for the particular subscriber. As there was no intelligence transfer into the permanent record stores, no further circuit operation takes place.

Referring now to Figs. 31 and 32, when position pulse P1 appears there is a meter pulse on the "P lead." It is desirable now to change the condition of element EM1 to "1" and erase the previous timing, this being achieved as follows. Waveform *tm*1 causes F2 to test the P lead, and finding a meter pulse present F2 changes over to F2D conducting. As the condition of EM1 was previously 0, then F1 will be at F1B, and this condition becoming coincident with F2D and *tm*1 causes gate G8 to conduct and consequently F5 to conduct at F5J, denoting a transition of the "P lead" condition. Pulse *t*2 becoming coincident with *tm*1 and F2D causes gate G12 to conduct and hence F4G to record a "1." Condition F5K conducting having ceased, gate G6 is inoperative and hence the addition control of F3F is inhibited. At time *t*2 of the subsequent elements WT and F5J cause gate G22 to conduct and consequently F4H to record an "0," thus any previous time store information is erased. Also the appearance of waveform WT will cause F2 to be reset to F2C. The timing store is now in a condition such that the special first element EM1 is 1, and elements ET, 1, 2 and 3 are all "0." Special element EM2 now appears, but does not perform any circuit function at this stage, being repeated as an "0" via gate G23.

The next section is the temporary fee store, and the circuit functions required are to make the first element EM3 a "1," i. e. "chalk mark," and to add 1 to the remaining elements, indicating that a meter pulse has occurred. These circuit functions are achieved as follows.

Waveform *tm*3 causes gate G2 to conduct and F2 to re-test the P lead, the presence of a meter pulse causing F2 to conduct at F2D. The element EM3 was previously 0, hence F1 will have F1B conducting. Pulse *t*2 becoming coincident with F2D, F1B and *tm*3 causes gate G7 to conduct and consequently F3F. The same pulse in conjunction with F2D and *tm*3 causes gate G16 to conduct and hence F4G to record a "1," the "chalk mark." The addition control circuit being initiated at this time will not cause any circuit function as waveform WF is not present. Element EM3 having passed, waveform *tm*3 ceases, and waveform WF appears with element EF1. Waveform WF causes F2 to be reset to F2C. By virtue of the previous track condition, element EF1 will cause F1 to be conducting at F1B. Coincidence between F1B, WF, *t*2 and F3F causes gate G17 to conduct, and subsequently F4G to record a "1." This circuit action fulfils the conditions for adding 1, and hence the pulse *t*3 during element EF1, becoming coincident with WF and F1B causes gate G4 to conduct and F3 to be reset to F3E conducting. This completes the circuit functions of the temporary fee store, the remaining elements at pulse *t*2, being repeated unchanged by gates G18 and G26, although the track conditions will cause only gate G26 to be operative. Thus after the first revolution during a meter pulse the track condition is such that the special timing element is a "1," and any previous intelligence erased. The temporary fee store has a "chalk mark" on element EM3, and intelligence set up on the remaining elements indicative of one meter pulse. Waveforms of circuit elements are shown in Fig. 31, and the track condition Fig. 32.

Assume now the drum makes another revolution with the meter pulse still on. At the time of element EM1 and waveform *tm*1, F2 will conduct at F2C as before. Due to the previous track conditions, that EM1 was a 1, F1 will be conducting at F1A. Condition F1A becoming coincident with *tm*1 and F2D causes gate G10 to conduct ensuring that F5 is conducting at F5K. Pulse *t*2 occurring during element EM1 in conjunction with F2D and *tm*1 causes gate G12 to conduct and hence F4G, to repeat this element as a 1. Also pulse *t*2 becoming coincident with *tm*1 and F5K causes F3 to conduct at F3F via gate G6, thus preparing the addition circuit. Element EM1 passes and element ET1 appears, at the same time waveform *tm*1 ceases and waveform WT appears, initiating the following circuit functions. Waveform WT causes F2 to be reset to F2C. Element ET1 will cause F1 to be conducting at F1B, hence pulse *t*2 becoming coincident with F3F, WT and F1B causes gate G13 to conduct, and subsequently F4G to record a 1. This completes the circuit functions for the addition of 1, and pulse *t*3 becoming coincident with WT and F1B causes F3 to be reset to F3E via gate G5. The remaining time store elements are then repeated unchanged by gates G14 and G21. The element E*m*2 causes no circuit function, and is repeated as "0" by gate G23.

The first element of the temporary fee store now causes F1 to conduct at F1A, and waveform *tm*3 causes F2 to retest the P lead and conduct at F2D, as before. Pulse *t*2 becoming coincident with *tm*3 and F2D causes gate G16 to conduct and repeat the "chalk mark" via F4G. Due to the fact that the "chalk mark" caused F1 to be conducting at F1A, gate G7 will be inoperative, and hence the addition control circuit inhibited. Thus the temporary fee store intelligence contained in elements EF1, 2 and 3 will be repeated unchanged by gates G18 and G26, waveform *tm*3 having ceased and waveform WF appeared during these elements. Waveform WF reset F2 to F2C at the time of element EF1 as before.

The track condition at the end of the second cycle is such that EM1 is a 1 and the time store increased by 1, and the temporary fee store remains unchanged.

Assume now that when the particular track section appears at the read head the meter pulse has ceased as shown in Fig. 33, waveform *tm*1 cause F2 to test the P lead via gate G1, but as there is no P lead condition F2 remains conducting at F2C. Element EM1 will cause F1 to be conducting at F1A, hence coincidence between F1A, F2C and *tm*1 will cause gate G9 to conduct, and subsequently F5 at F5J, this denoting a transition of the P lead condition. Pulse *t*2 becoming coincident with *tm*1 and F2C causes gate G19 to conduct, and hence F4 to record an "0" at F4H. The fact that F5K is no longer operative, inhibits the addition control circuit, due to gate G6 not conducting. Element EM1 now passes, waveform *tm*1 ceases, and WT appears. At pulse *t*2 of each element, coincidence with WT and F5J causes gate G22 to conduct, and subsequently F4 to record an "0" at F4H, thus erasing any previous timing intelligence. Element EM2 is repeated as "0" in the same manner as before. The temporary fee store now appears and with it waveform *tm*3. Element EM3 containing the "chalk mark" causes F1 to conduct at F1A, but F2 will now be at F2C. Thus coincidence between pulse *t*2, *tm*3 and F2C causes gate G24 to conduct, and hence F4 to remove the "chalk mark" at F4H. The addition control flip-flop F3 remained operated at F3E, hence when track element E*m*3 passes *tm*3 ceases and waveform WF appears, the intelligence in the elements EF1, 2 and 3 is repeated unchanged by gates G26 and G18. Thus after the first cycle with the meter pulse off, the timing section is at zero, ready to start timing the period for which the pulse is off, and the temporary fee stores contains no "chalk mark" and intelligence indicative of one meter pulse.

Should another meter pulse occur before fee transfer takes place, the operation would be identical with that previously described, the temporary fee store being increased by one, indicating two meter pulses.

Assume that the meter pulse has ceased, and that sufficient time has elapsed for fee transfer to start. The condition for this is the same as for the single track scheme, that is binary 8 is stored on the time store elements, i. e. ET4 is a 1. Operation until this element is reached is the same as previously described for no condition on the P lead. At the time of element ET4 F1 will conduct at F1A, coincidence of this condition with pulse *tt* causes gate G33 to conduct and hence F6 to change over to F6S. The next element to appear is EM2, and with F6S conducting coincidence of pulse *t*2 and *tm*2 causes gate G15 to conduct, and hence F4 to record a 1 at F4G. At the time of element EM3, gate G24 will cause an "0" to be recorded at F4H. The circuit function required, is to transfer the intelligence in temporary feed store elements to the multi-stable register F7, and after ensuring that the intelligence on both halves of the permanent record fee tracks has been modified, erase this information from the temporary fee store, this being achieved in the following manner. The intelligence stored in the fee store is binary one, i. e. the track condition for elements ET1, 2 and 3 being 1, 0 and *o* respectively. These track conditions will cause F1 to conduct at F1A, F1B, F1B, respectively in turn. Hence at the time of element ET1, F1 will be at F1A, and coincidence between this condition and *tf*1 and F6S will cause gate G29 to conduct and consequently F7S. Coincidence between WF, F8V, *t*2 and F3E will cause gate G18 to conduct and 1 to be recorded by F4G. As the two remaining elements are 0 they will cause no further circuit function and will be re-recorded via gate G26. At the time of element ET3, pulse *tf*3 occurs and coincidence between this pulse and F6S and F8V at time *t*3 causes F11L to conduct via gate G42.

The timing and temporary fee tracks then cease, and the permanent fee stores appear and with them waveform WA. Coincidence between F7S and WA opens gates G44 and G45, giving the read head F9 access to the track used for single fee storage. With waveform WA, F7D, F7T and F7Q control gates G46, G47; G48, G49; and G50, G51 respectively, and hence control recording on double, treble and quadruple fee tracks. It must be remembered that only one of these four track gate circuits can be operative at one time, it not being desired or possible to modify the intelligence on more than one record track for any given metering operation. Reference should be made to Figs. 34, 35.

The principle of addition is identical with that used in the timing and temporary fee circuits. F11 being equivalent to F5, F9 equivalent to F1, and F10 equivalent to F4. Thus assuming that there was no previous intelligence on the tracks, element SF1 of the single fee track will cause F9 to conduct at F9X via gate G55. Coincidence between F9X, F11L and pulse *t*2 will cause gate G40 to conduct and hence F10Y to record a 1. This circuit function fulfils the conditions for the addition of 1 hence coincidence between F9X, WA and *t*3 causes gate G43 to conduct and F11 to be reset to F11M. The following track intelligence from elements SF2 to SF12 will be repeated via gates G59 and G55 to F9, and recorded unchanged by F10 via gates G38 and G39 and the track gates G44 and G45. At the end of the waveform WA the circuit becomes inoperative all the records tracks gates being inhibited. Also at this time due to the subscribers track position overlap, the occurrence of waveform *tm*3 in coincidence with *t*2 causes gate G28 to conduct and F7 to be reset to F7M.

The track condition is now such that binary 8 is set up in the time store and 1 in the temporary fee store. As previously stated it is desirable to erase the temporary fee store information as it is set up on F7, but due to the fact that the circuit is a read and record system only one half of the track is modified on the first cycle. If the information were erased at the first time of fee transfer, then there would be no intelligence to initiate the addition of one into the second half of the circuit. Thus on the first fee transfer the track information on the permanent record store is modified but, the temporary fee store information is not erased. Instead a special mark is placed on element EM2, the purpose of which is to ensure that the information on the first half of the permanent fee store tracks is transferred to the second half and then the temporary fee store intelligence erased. This being achieved in the following manner.

During the second cycle of fee transfer *tt* and element ET4 again cause F6 to conduct at F6S. The next element is EM2 but due to the previous cycle circuit operations, EM2 will cause F1 to be at F1A. This condition in conjunction with *tm*2 will cause F8 to conduct at F8U. The information in the temporary fee store will be transferred to F7, as before, but now F8U becoming coincident with WF and pulse *t*2 of each element will cause gate G27 to conduct and F4H to record an "0" thus erasing the track intelligence. At the commencement of the permanent record fee stores, F7S causes the previously modified track intelligence to be read by F9 via gates G59 and G55. This information is then transferred unchanged by F10 to the second half of the track, the addition control flip-flop F11 being inoperative due to the absence of F8V from gate G42.

The intelligence on both sides of the permanent record fee stores is now changed and at the end of the store waveform WA ceases, closing the record track gates G44 and G45.

At time *tm*1 of the next subscribers timing and temporary fee store F8 is reset to F8V, and at time *tm*3 F7 is again reset to F7N.

The circuit is now ready to receive further metering pulses, the temporary fee store intelligence has been erased, and appropriate permanent fee record track increased by one.

The special gates used to reset F3 in the single track scheme, should the last element in a permanent record store be a 1, is also required by F11, this circuit function being achieved by the use of waveform *tm*3.

While the principles of the invention have been described above in connection with specific embodiments, and particular modifications thereof, it is to be clearly understood that this description is made only by way of example and not as a limitation on the scope of the invention.

What we claim is:

1. Intelligence storage equipment, which comprises a number of user circuits, a number of stores on each of which different items of intelligence can be recorded, a plurality of which are individually allocated to each one of said user circuits, common recording and reading means for reading intelligence in said stores, a control circuit for controlling operation of said recording and reading means, and discriminating means in said control circuit under control of said user circuits for causing said recording means to record intelligence relating to any one of said user circuits on a store allocated to that user circuit.

2. Intelligence storage equipment, which comprises a number of user circuits, an endless track of magnetic-material on which different items of intelligence can be recorded and which provides a number of stores, a plurality of which are individually allocated to each one of said user circuits, common recording and reading means for recording and reading intelligence in said track, a control circuit for controlling operation of said recording and reading means, and discriminating means in said control circuit under control of said user circuits for causing said recording means to record intelligence relating to any one of said user circuits on a store allocated to that user circuit.

3. Intelligence storage equipment as claimed in claim 2, in which there are a number of sets of stores, each of which sets has its own recording and reading means, said control circuit being common to all of said sets of stores, and in which a store in each of said sets is individually allocated to each of said user circuits.

4. Intelligence storage equipment, which comprises a number of user circuits, a rotatable drum having a peripheral skin of magnetic material which provides a number of circumferential tracks on each of which intelligence can be recorded and each of which tracks provides a number of stores, a plurality of said stores being allocated to each of said user circuits, each of said stores allocated to one of said user circuits, forming part of a different one of said tracks, different recording and reading means for recording and reading intelligence in each of said tracks, respectively a control circuit for controlling operation of all of said recording and reading means, and discriminating means in said control circuit under control of said user circuits for causing the appropriate one of said recording means to record intelligence relating to any one of user circuits on any one of the stores allocated to that user circuit.

5. Equipment as claimed in claim 4, in which one of the stores allocated to each of said user circuits is a temporary store, and in which said control circuit comprises means responsive to reception of intelligence relating to an user circuit to cause said recording means to record said intelligence in the temporary store allocated to that user circuit, and means for causing the recorded intelligence to be transferred from said temporary store to another store allocated to that user circuit.

6. Equipment as claimed in claim 4, in which one of the stores allocated to each of said user circuits is a temporary store, and in which said control circuit comprises means responsive to reception of intelligence relating to an user circuit to cause the recording means associated with the temporary stores allocated to that user circuit to record said intelligence in said temporary store, discriminating means arranged to determine the nature of said received intelligence, and means under control of said discriminating means for causing the recorded intelligence to be transferred from the temporary store to the appropriate one of the other stores allocated to that user circuit.

7. Intelligence storage equipment, which comprises a temporary store and another store on each of which different items of intelligence can be recorded, a common recording and reading means for recording and reading intelligence in said stores, a control circuit for controlling operation of said recording and reading means, means in said control circuit responsive to the reception of intelligence to be stored to cause said recording means to record said intelligence in said temporary stores and means in said control circuit for causing the intelligence recorded in said temporary store to be transferred to said other store.

8. Intelligence storage equipment, which comprises a temporary store, a number of other stores on each of which different items of intelligence can be recorded, common recording and reading means for recording and reading intelligence in said stores, a control circuit for controlling operation of said recording and reading means, means in said control circuit responsive to the reception of intelligence to be stored to cause said recording means to record said intelligence in said temporary store, discriminating means in said control circuit for determining the nature of said received intelligence, and means in said control circuit responsive to determination by said discriminating means of the nature of said intelligence to cause said recording means to record the intelligence already recorded in said temporary store in that one of said other stores which is appropriate to the nature of the received intelligence.

9. Intelligence storage equipment as claimed in claim 8, in which the received intelligence is any one of a plurality of kinds of intelligence item each of which is represented by a different number (including one) of pulses, in which said control circuit further comprises means responsive to reception of a pulse from one of said user circuits to cause a recording in the temporary store allocated to that user circuit to indicate that reception of an intelligence item has commenced and discriminating means under control of said recording in said temporary store and of received intelligence to determine the number of pulses received, and in which said means for causing transfer comprises means under control of said discriminating means for recording said received intelligence in that one of said other stores allocated to that type of intelligence for that user circuit and for cancelling the recording in said temporary store.

10. Intelligence storage equipment as claimed in 9, and in which each time an intelligence item is recorded in one of said other stores allocated to an user circuit, said item is recorded therein by adding one to a number already recorded therein, whereby the numbers of said different kinds of intelligence item relating to each said user are separately counted.

11. Intelligence storage equipment as claimed in claim 10, further comprising an additional store and in which said control circuit comprises means responsive to the end of a pulse received from an user circuit to control a count by said additional store allocated to the same user circuit of the number of successive examinations of said store after the end of said pulse, means responsive to reception of a further pulse from said user circuit to cancel said count, and means responsive to said count assuming a predetermined value indicating that there are no more pulses to cause said intelligence to be transferred from said temporary store to that one of said other stores allocated to that user which is appropriate to the type of item which has been received.

12. A subscribers' metering system such as is used in automatic telecommunication exchange systems, which comprises a number of incoming metering leads each associated with a subscriber's line, a number of stores on each of which intelligence can be recorded, a plurality of said stores being allocated to each of said subscribers for recording separately the numbers of calls of each of a plurality of fee values for each of said subscribers, common recording and reading means for recording and reading intelligence in said stores, a control circuit for controlling operation of said recording and reading means, means in said control circuit responsive to reception of a metering signal on the metering lead of one of said subscribers, discriminating means in said control circuit under control of said responsive means for determining the fee value to which a received metering signal relates, means in said control circuit for causing said reading means to read the contents of that one of said stores allocated to the subscriber from whom a metering signal has been received which relates to the fee value for the call being metered, means in said control circuit for adding one to the number of calls already stored in the section read out, and means in said control circuit for causing said recording means to record the modified number of calls in the store from which a number was read out to be modified.

13. A subscribers' metering system as claimed in claim 12, and which comprises a temporary store allocated to each of said subscribers in which a received metering signal is recorded prior to determination by said discriminating means of the fee value to which said signal relates.

14. A subscribers' metering system as claimed in claim 13, and in which all of the stores allocated to a single subscriber form part of a single set of stores served by the same recording and reading means.

15. A subscribers' metering system as claimed in claim 13 and in which the stores allocated to a single subscriber each forms part of a different set of stores, each of said stores being served by its own recording and reading means.

16. A subscribers' metering system as claimed in claim 13, in which each metering signal is a number (including one) of pulses representing its fee value, and in which said discriminating means comprises means responsive to commencement of reception of a pulse on a subscriber's metering lead to cause a recording in the temporary store allocated to that subscriber indicating that a pulse has been received, means responsive to the end of a pulse on a subscriber's metering lead to control a count by a further store allocated to that subscriber of the number of examinations of said store after said pulse ends, means responsive to reception of a further pulse to cancel said count, and means responsive to said count assuming a predetermined value indicating that there are no more pulses to cause one to be added to the number stored in that one of said fee value stores appropriate to the fee value indicated by said metering signal.

References Cited in the file of this patent

UNITED STATES PATENTS

| | | |
|---|---|---|
| 2,165,924 | Goodrum | July 11, 1939 |
| 2,165,925 | Goodrum | July 11, 1939 |
| 2,297,365 | Ostline | Sept. 29, 1942 |
| 2,513,112 | Shepherd | June 27, 1950 |
| 2,540,654 | Cohen et al. | Feb. 6, 1951 |
| 2,549,071 | Dusek et al. | Apr. 17, 1951 |
| 2,652,554 | Williams et al. | Sept. 15, 1953 |
| 2,680,239 | Daniels et al. | June 1, 1954 |